US011385331B2

(12) United States Patent
Bandstra et al.

(10) Patent No.: US 11,385,331 B2
(45) Date of Patent: Jul. 12, 2022

(54) ENCLOSURE FOR LIGHT DETECTION AND RANGING UNIT AND RELATED METHODS

(71) Applicants: Mark S. Bandstra, Newark, CA (US); Brian J. Quiter, Oakland, CA (US)

(72) Inventors: Mark S. Bandstra, Newark, CA (US); Brian J. Quiter, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 836 days.

(21) Appl. No.: 16/260,213

(22) Filed: Jan. 29, 2019

(65) Prior Publication Data
US 2019/0235055 A1 Aug. 1, 2019

Related U.S. Application Data

(60) Provisional application No. 62/623,218, filed on Jan. 29, 2018.

(51) Int. Cl.
G01S 7/481 (2006.01)
G01S 7/4861 (2020.01)
G01S 7/497 (2006.01)
G01S 17/42 (2006.01)

(52) U.S. Cl.
CPC .......... G01S 7/4813 (2013.01); G01S 7/4817 (2013.01); G01S 7/4861 (2013.01); G01S 7/497 (2013.01); G01S 17/42 (2013.01)

(58) Field of Classification Search
None
See application file for complete search history.

(56) References Cited

U.S. PATENT DOCUMENTS

| 6,259,512 | B1 * | 7/2001 | Mizouchi | G03F 7/70108 355/71 |
| 9,625,582 | B2 | 4/2017 | Gruver et al. | |
| 2006/0044546 | A1 * | 3/2006 | Lewin | G01S 17/46 356/4.03 |

(Continued)

FOREIGN PATENT DOCUMENTS

CN        105068085 A    * 11/2015

OTHER PUBLICATIONS

Frank Bertini, "How to Change the Laser Angle and FoV on a Velodyne VLP-16," publication on Velodyne LiDAR website, Oct. 25, 2016.

Primary Examiner — Yuqing Xiao
Assistant Examiner — Benjamin Richard Hebert

(57) ABSTRACT

This disclosure provides systems, methods, and apparatus related to light detection and ranging. In one aspect, a method comprises providing an apparatus. The apparatus comprises a LiDAR unit and a LiDAR enclosure. The LiDAR enclosure comprises a four-sided container having a square or rectangular cross-section with a first open end and a second open end comprising two opposite ends of the four-sided container. The LiDAR unit is attached to a mounting area inside the four-sided container. A reflective material is disposed on an interior of a second side and a third side of the four-sided container. Laser light is generated with the LiDAR unit. The laser light that has interacted with environment surrounding the LiDAR enclosure and that has been reflected back to the LiDAR unit is detected. The detected laser light is processed to construct an image of the environment surrounding the LiDAR enclosure.

20 Claims, 27 Drawing Sheets

(56) References Cited

U.S. PATENT DOCUMENTS

| | | | |
|---|---|---|---|
| 2010/0208234 A1* | 8/2010 | Kaehler | G01S 17/42 356/5.01 |
| 2016/0291134 A1 | 10/2016 | Droz et al. | |
| 2016/0327636 A1 | 11/2016 | Gazit et al. | |
| 2017/0082737 A1 | 3/2017 | Slobodyanyuk et al. | |
| 2017/0168146 A1 | 6/2017 | Boehmke | |

* cited by examiner

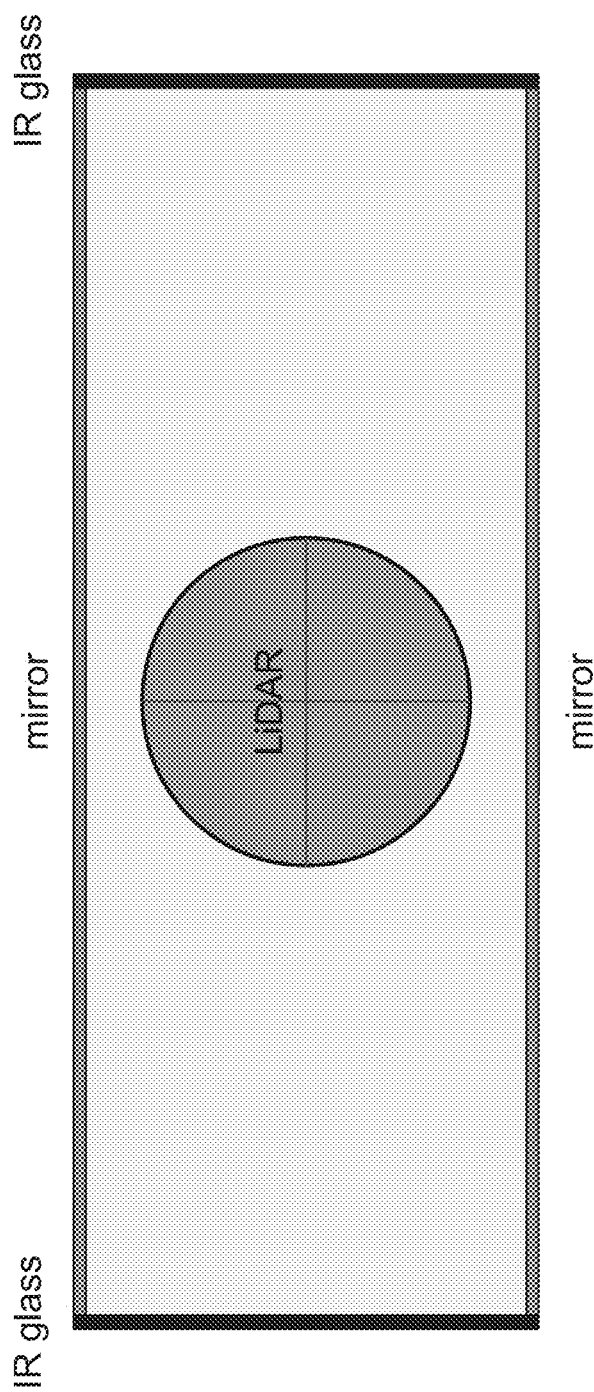

ENCLOSURE FOR LIGHT DETECTION AND RANGING UNIT AND RELATED METHODS

RELATED APPLICATIONS

This applications claims priority to U.S. Provisional Patent Application No. 62/623,218, filed Jan. 29, 2018, which is herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to light detection and ranging, also referred to as LiDAR.

BACKGROUND

Light detection and ranging (LiDAR) is a technique that measures distance to an object using a laser. In some implementations of LiDAR, an object is illuminated using pulsed laser light and the reflected pulses or laser light are measured with a sensor. LiDAR is similar to radio detection and ranging, or radar, which uses radio waves.

LiDAR is emerging as a crucial technology for computer vision, with widespread use in autonomous vehicles, robotics, and other applications. Typically, a LiDAR unit is placed at the top or outside of a vehicle, backpack, or other platform in a highly visible location so that it has an unobstructed view of the surroundings. A prominently mounted LiDAR unit often draws attention to the system on which it is mounted (e.g., Google StreetView cars (Alphabet Inc., Mountain View, Calif.) are easily noticed). Such a conspicuous configuration may not be desired in all applications (e.g., homeland security).

SUMMARY

A low-cost solution for applications where LiDAR is used but discreetness is desired is described herein. In order to cover the same area as a top-mounted LiDAR, a hidden LiDAR configuration either requires some kind of reflective surface or mirror configuration (e.g., the embodiments described herein) or two or more LiDAR units. Since LiDAR units can cost $5,000 or more and weigh 1 kilogram (kg) to 2 kg, the embodiments described herein can save weight, cost, and power consumption. Additional benefits may include lower data rates as compared to multiple LiDAR units and the calibration and synchronization of only one LiDAR unit instead of multiple LiDAR units.

One innovative aspect of the subject matter described in this disclosure can be implemented in a method comprising: (a) providing an apparatus; (b) generating laser light with the LiDAR unit; (c) detecting the laser light that has interacted with environment surrounding the LiDAR enclosure and that has been reflected back to the LiDAR unit; and (d) processing detected laser light to construct an image of the environment surrounding the LiDAR enclosure. The apparatus comprises a light detection and ranging (LiDAR) unit and a LiDAR enclosure. The LiDAR enclosure comprises a four-sided container having a square or rectangular cross-section with a first open end and a second open end comprising two opposite ends of the four-sided container, a mounting area inside the four-sided container and on first side of the four-sided container with the mounting area operable to accept the LiDAR unit and the LiDAR unit being attached to the mounting area, and a reflective material disposed on an interior of a second side and a third side of the four-sided container. The mounting area is about equidistant from the first open end and the second open end. The second side and the third side are substantially perpendicular to the first side. The second side and the third side are substantially parallel to one another.

In some implementations, processing the laser light comprises: (e) receiving an azimuth angle and range from the LiDAR unit for a detected point in the detected laser light; (f) rejecting the detected point when the azimuth angle is greater than a maximum azimuth angle for generated laser light to escape the LiDAR enclosure; (g) when the detected point is not rejected, determining a number of reflections of the generated laser light and the detected laser light in the LiDAR enclosure; (h) when the number of reflections is greater than zero, correcting the azimuth angle of the detected point to an actual azimuth angle of the detected point and correcting the range of the detected point to an actual range of the detected point, and when the number of reflections is zero, the azimuth angle of the detected point is the actual azimuth angle of the detected point and the range of the detected point is the actual range of the detected point; (i) repeating operations (e)-(h) for a plurality of detected points; and (j) constructing the image of the environment surrounding the LiDAR enclosure with the actual azimuth angle and the actual range of the plurality of detected points.

In some implementations, prior to operation (i), an intensity of the detected point is corrected based on a number of reflections of the generated laser light and the detected laser light in the LiDAR enclosure. In some implementations, before operation (e), the detected point is transformed to a positive quadrant from its original quadrant. After operation (h), the detected point is transformed back to the original quadrant.

In some implementations, the apparatus further comprises a material disposed over the first open end and the second open end of the four-sided container. The material transmits at least about 85% of generated laser light of the LiDAR unit. In some implementations, the material blocks at least about 85% of visible light.

In some implementations, the four-sided container comprises an acrylic. In some implementations, the reflective material comprises aluminum, copper, silver, or gold.

Another innovative aspect of the subject matter described in this disclosure can be implemented in a device comprising a four-sided container having a square or rectangular cross-section with a first open end and a second open end comprising two opposite ends of the four-sided container, a mounting area inside the four-sided container and on first side of the four-sided container with the mounting area operable to accept a light detection and ranging (LiDAR) unit, and a reflective material disposed on an interior of a second side and a third side of the four-sided container. The second side and the third side are substantially perpendicular to the first side. The second side and the third side are substantially parallel to one another. The mounting area is about equidistant from the first open end and the second open end.

In some implementations, the reflective material is disposed on the interior of the first side and a fourth side of the four-sided container. The fourth side is substantially perpendicular to the second side and the third side. The first side and the fourth side are substantially parallel to one another.

In some implementations, a material is disposed over the first open end and the second open end of the four-sided container, and the material transmits at least about 85% of laser light generated by the LiDAR unit. In some embodiments, the material blocks at least about 85% of visible light.

In some implementations, the four-sided container comprises an acrylic. In some implementations, the reflective material comprises aluminum, copper, silver, or gold.

In some implementations, the device further comprises the LiDAR unit.

Another innovative aspect of the subject matter described in this disclosure can be implemented in a method comprising: (a) providing an apparatus; (b) generating laser light with the LiDAR unit; (c) detecting the laser light that has interacted with environment surrounding the LiDAR enclosure and that has been reflected back to the LiDAR unit; and (d) processing detected laser light to construct an image of the environment surrounding the LiDAR enclosure. The apparatus comprises a light detection and ranging (LiDAR) unit and a LiDAR enclosure. The LiDAR enclosure comprises a four-sided container having a square or rectangular cross-section with a first open end and a second open end comprising two opposite ends of the four-sided container, a mounting area inside the four-sided container and on first side of the four-sided container, the mounting area operable to accept the LiDAR unit and the LiDAR unit being attached to the mounting area, and a reflective material disposed on an interior of the first side, a second side, a third side, and a fourth side of the four-sided container. The mounting area is about equidistant from the first open end and the second open end. The second side and the third side are substantially perpendicular to the first side. The second side and the third side are substantially parallel to one another. The fourth side is substantially perpendicular to the second side and the third side. The first side and the fourth side are substantially parallel to one another. In some implementations, processing the detected laser light comprises: (e) receiving an azimuth angle, an elevation angle, and a range from the LiDAR unit for a detected point in the detected laser light; (f) rejecting the detected point when the azimuth angle is greater than a maximum azimuth angle for generated laser light to escape the LiDAR enclosure or when the elevation angle is greater than a maximum elevation angle for the generated laser light to escape the LiDAR enclosure; (g) when the detected point is not rejected, determining a number of azimuthal reflections of the generated laser light and the detected laser light in the LiDAR enclosure; (h) when the number of azimuthal reflections is greater than zero, correcting the azimuth angle of the detected point to an actual azimuth angle of the detected point and correcting the range of the detected point to a corrected range of the detected point, and when the number of azimuthal reflections is zero, the azimuth angle of the detected point is the actual azimuth angle of the detected point and the range of the detected point is the corrected range of the detected point; (i) when the detected point is not rejected, determining a number of elevation reflections of the generated laser light and the detected laser light in the LiDAR enclosure; (j) when the number of elevation reflections is greater than zero, correcting the elevation angle of the detected point to an actual elevation angle of the detected point and correcting the corrected range of the detected point to an actual range of the detected point, and when the number of elevation reflections is zero, the elevation angle of the detected point is the actual elevation angle of the detected point and the corrected range of the detected point is the actual range of the detected point; (k) repeating operations (e)-(j) for a plurality of detected points; (l) constructing the image of the environment surrounding the LiDAR enclosure with the actual azimuth angle, the actual elevation angle, and the actual range of the plurality of detected points.

In some implementations, prior to operation (k), an intensity of the detected point is corrected based on a number of reflections of the generated laser light and the detected laser light in the LiDAR enclosure. The number of reflections of the generated laser light and the detected laser light in the LiDAR enclosure includes the number of azimuthal reflections and the number of elevation reflections. In some implementations, before operation (e), the detected point is transformed to a positive octant from its original octant. After operation (j), the detected point is transformed back to the original octant.

In some implementations, the apparatus further comprises a material disposed over the first open end and the second open end of the four-sided container. The material transmits at least about 85% of generated laser light of the LiDAR unit. In some implementations, the material blocks at least about 85% of visible light.

In some implementations, the reflective material comprises aluminum, copper, silver, or gold.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 14 shows an example of a top-down schematic illustration of a LiDAR enclosure.

DETAILED DESCRIPTION

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a value is close to a targeted value, where close can mean, for example, the value is within 80% of the targeted value, within 85% of the targeted value, within 90% of the targeted value, within 95% of the targeted value, or within 99% of the targeted value. LiDAR ENCLOSURE A LiDAR enclosure can conceal a LiDAR unit without compromising a large fraction of the field of view of the LiDAR unit. The LiDAR enclosure encloses a LiDAR unit, and has interior faces made of parallel reflective surfaces (e.g., mirrors) having high reflectance (e.g., high infrared reflectance for the lasers used in some LiDAR units). The reflective surfaces reflect the laser beams from the LiDAR unit out of the enclosure and reflect the returned laser beams back towards the LiDAR unit. This enables the LiDAR unit to remain within the enclosure to reduce or eliminate the visibility of the LiDAR unit.

Figure 1A:
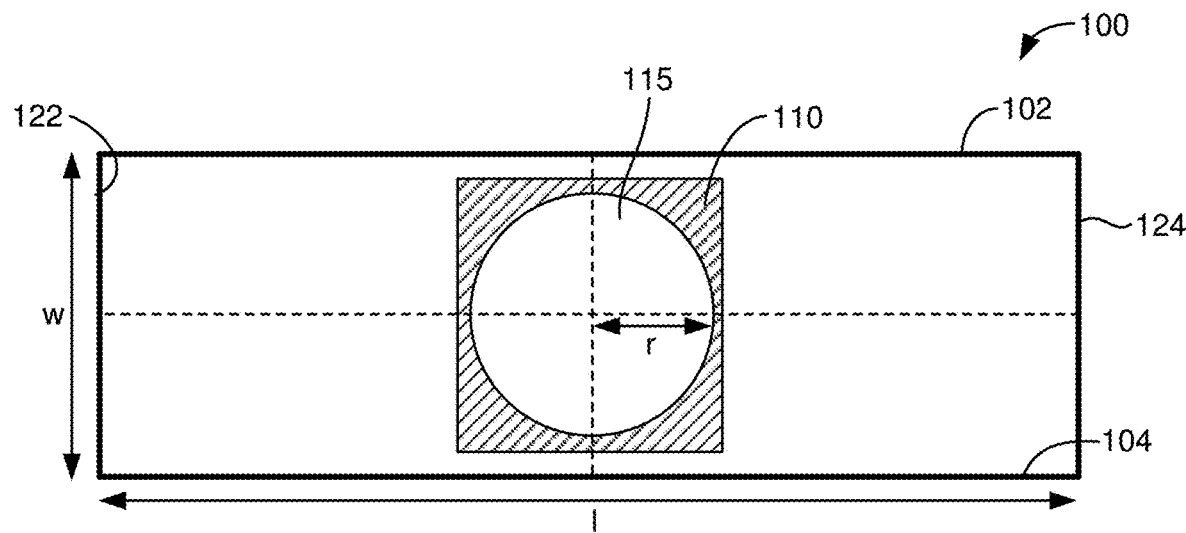
FIGS. 1A-IC show examples of schematic illustrations of a LiDAR enclosure and a LiDAR unit.
Figure 1B:
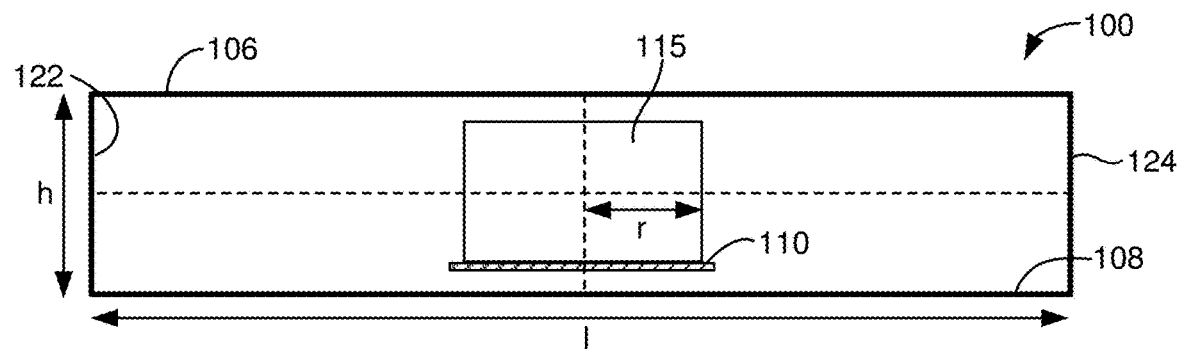
Figure 1C:
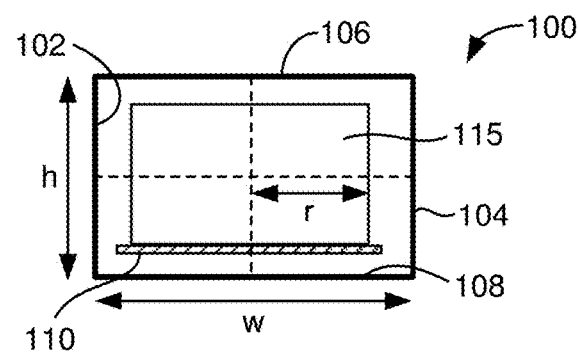

FIGS. 1A-1C show examples of schematic illustrations of a LiDAR enclosure and a LiDAR unit. FIG. 1A is a top-down schematic illustration. FIG. 1B is a cross-sectional schematic illustration. FIG. 1C is an end schematic illustration.

As shown in FIGS. 1A-1C, a LiDAR enclosure 100 includes two reflective surfaces 102 and 104 that are opposite one another and substantially parallel or parallel to one another. These two surfaces comprise the sides of the LiDAR enclosure 100. The LiDAR enclosure 100 includes two additional surfaces 106 and 108 that are opposite one another and substantially parallel or parallel to one another. These two surfaces comprise the top and the bottom of the LiDAR enclosure 100. The two surfaces 102 and 104 of the LiDAR enclosure 100 are substantially perpendicular to or perpendicular to the surfaces 106 and 108. In some embodiments, the surfaces 106 and 108 are reflective. In some embodiments, the LiDAR enclosure has a square or rectangular cross-section The LiDAR enclosure 100 further includes an area 110 for mounting a LiDAR unit 115. In some embodiments, the area 110 includes clamps, screws, bolts, or similar hardware so that a LiDAR unit 115 can be mounted or installed inside the LiDAR enclosure 100. In some embodiments, the LiDAR unit 115 is rigidly mounted within the enclosure 100. In some embodiments, the LiDAR unit 115 comprises a laser scanner that is operable to scan a broad angular range, such as a Velodyne VLP-16 or a Velodyne HDL-32E (Velodyne LiDAR, San Jose, Calif.).

In some embodiments, the LiDAR enclosure 100 includes windows 122 and 124 that are opposite one another on the ends of the LiDAR enclosure 100. In some embodiments, the LiDAR enclosure 100 does not include windows, and the LiDAR enclosure defines a first open end and a second open end, In some embodiments, dimensions of the LiDAR enclosure 100 are specified based on the characteristics and dimensions of the LiDAR unit 115. Important characteristics of the LiDAR unit 115 include the radius r of the LiDAR unit and the range of elevation angles at which the LiDAR unit 115 emits laser light (i.e., if the LiDAR unit emits laser light at different elevations). In some embodiments, dimensions of the LiDAR enclosure 100 are specified based on the characteristics and dimensions of the LiDAR unit 115 and on the application of LiDAR enclosure 100. For the following descriptions of LiDAR enclosures, the length, the internal width, and the internal height are labeled 1, w, and h, respectively, as shown in FIGS. 1A-1C. In some embodiments, the LiDAR enclosure 100 is about 12 inches to 16 inches in length, about 8 inches in width, and about 5 inches in height when using a LiDAR unit that has about a 6 inch diameter (e.g., Velodyne VLP-16, (Velodyne LiDAR, San Jose, Calif.)). The width of the LiDAR enclosure 100 determines, in part, the number of laser beams from the LiDAR unit 115 that can escape the LiDAR enclosure 100.

In some embodiments, the reflective surfaces 102, 104, 106, and 108 have a reflectance of about 85% or greater, about 90% or greater, or about 95% or greater at the wavelength of the laser light used by the LiDAR unit 115 (e.g., 903 nm for Velodyne LiDAR units (Velodyne LiDAR, San Jose, Calif.)). High reflectance is needed so that multiple reflections do not degrade the intensity of the laser below the ability of the LiDAR unit 115 to detect the return.

In some embodiments, the reflective surfaces 102, 104, 106, and 108 comprise a glass or a polymer (e.g., acrylic). In some embodiments, the glass or polymer reflective surfaces 102, 104, 106, and 110 have a reflective coating disposed on the glass or polymer. In some embodiments, the reflective coating comprises copper, silver, or gold. Copper, silver, and gold have high reflectance in the near infrared, the wavelength of many of the lasers used in LiDAR units. In some embodiments, the reflective coating comprises aluminum. Aluminum has an absorption feature near 900 nm, which may need compensation when used as a reflective coating with some LiDAR units.

In some embodiments, the reflective coating in disposed on the interior surfaces of the reflective surfaces 102, 104, 106, and 108 of the LiDAR enclosure 100. With the reflective coating disposed on the interior surfaces of the reflective surfaces (e.g., instead of the outer surfaces) of the LiDAR enclosure 100 improves the reflectance because the laser light from the LiDAR unit 115 does not have to travel through the glass or polymer of the reflective surface before being reflected.

In some embodiments, the windows 122 and 124 comprise a material that has a high transmittance at the wavelength of the laser light generated by the LiDAR unit 115 so as not to degrade the intensity of the laser light. In some embodiments, to conceal the LiDAR unit 115 further within the LiDAR enclosure 100, the windows 122 and 124 comprise a glass or a plastic that is transparent at the wavelength of the laser light used by the LiDAR unit 115 but opaque in visible light. In some embodiments, the windows 122 and 124 transmit at least about 85% of laser light generated by the LiDAR unit 115. In some embodiments, the windows 122 and 124 block at least about 85% of visible light. For example, in some embodiments, the end windows comprise infrared glass, which is transparent to infrared light but opaque to visible light. Depending on the refractive properties of material of the windows 122 and 124, the dead zone (described below) may have to be expanded to exclude laser beam paths that internally reflect at high incidence angles.

In some embodiments, the LiDAR enclosure 100 includes only one open end. For example, the LiDAR enclosure 100 may only include an open end on the right hand side or the left hand side of FIGS. 1A and 1B. The end of the LiDAR enclosure that is not open may be shortened. This could be pictured as a LiDAR unit positioned in the back of an elongated box. A LiDAR unit within such a LiDAR enclosure would be operable to only generate an image of the area around the open end of the LiDAR enclosure. This would increase the area of the dead zone of the LiDAR unit within the LiDAR enclosure. Such an embodiment may be used in applications in which an image of only a portion of the environment surrounding the LiDAR enclosure is used.

Figure 2:
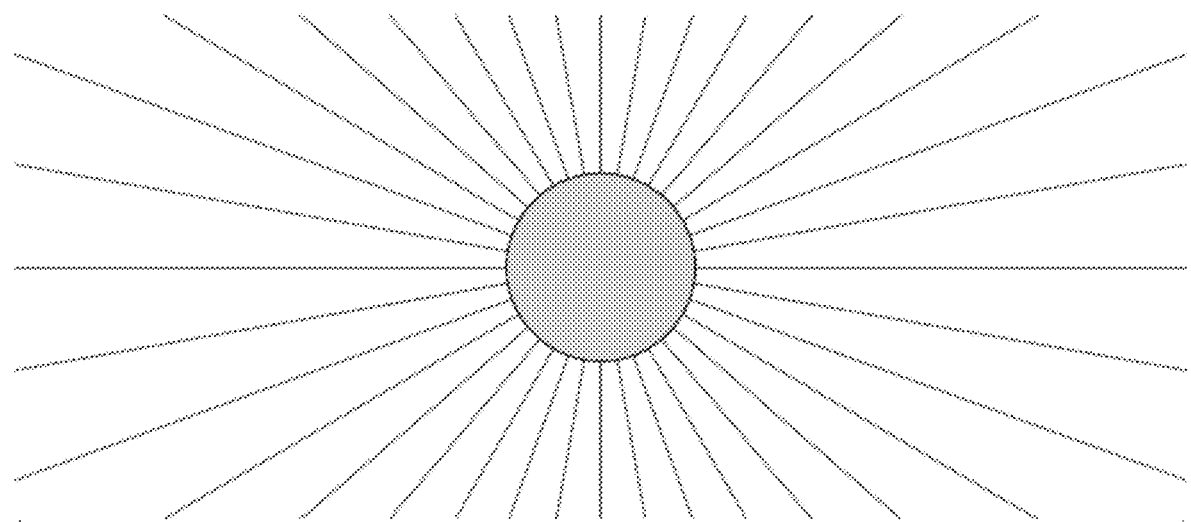
FIGS. 2 and 3 show examples of diagrams depicting how the laser beam paths from a LiDAR unit would be reflected by a LiDAR enclosure.
Figure 3:
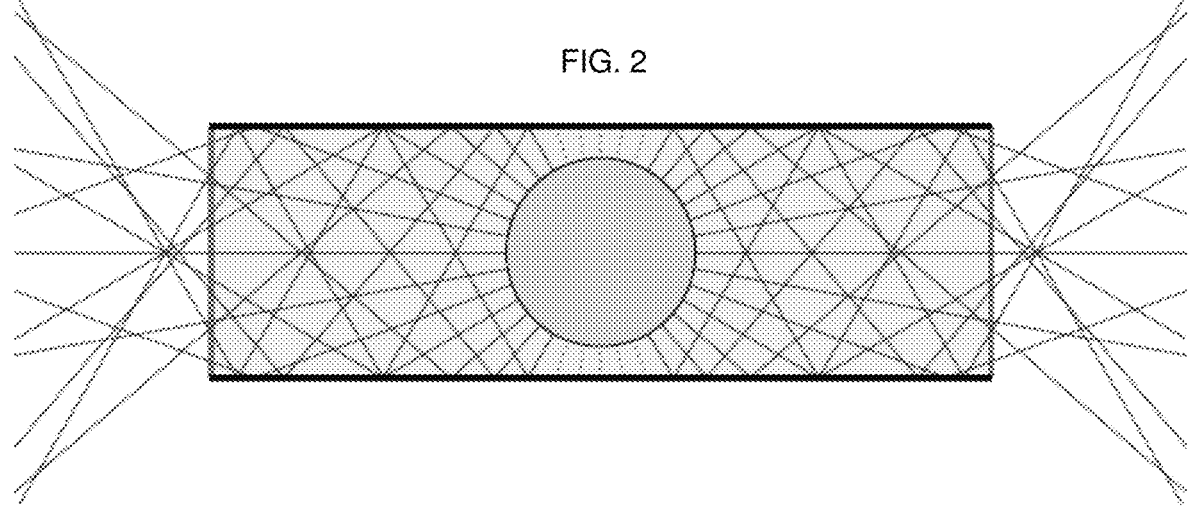

A LiDAR enclosure operates by using parallel reflective surfaces inside the enclosure to reflect the laser beams out of the enclosure at specific angles so that the detected points can be correctly reconstructed in three dimensions. By keeping the LiDAR unit inside the enclosure, it is possible to mount the LiDAR unit in situations that otherwise would disfavor the use of LiDAR. FIGS. 2 and 3 show examples of diagrams depicting how the laser beam paths from a LiDAR unit would be reflected by the enclosure. FIG. 2 shows a top-down view of an ideal LiDAR unit showing a subset of laser beam paths. FIG. 3 shows a top-down view of an ideal LiDAR unit inside a LiDAR enclosure showing how the laser beam paths are reflected by the reflective surfaces. As shown in FIG. 3, not all laser beam paths will be able to escape the enclosure; these paths make up the "dead zone." Laser beam paths that are blocked (the "dead zone") are marked with dotted lines.

Figure 4:
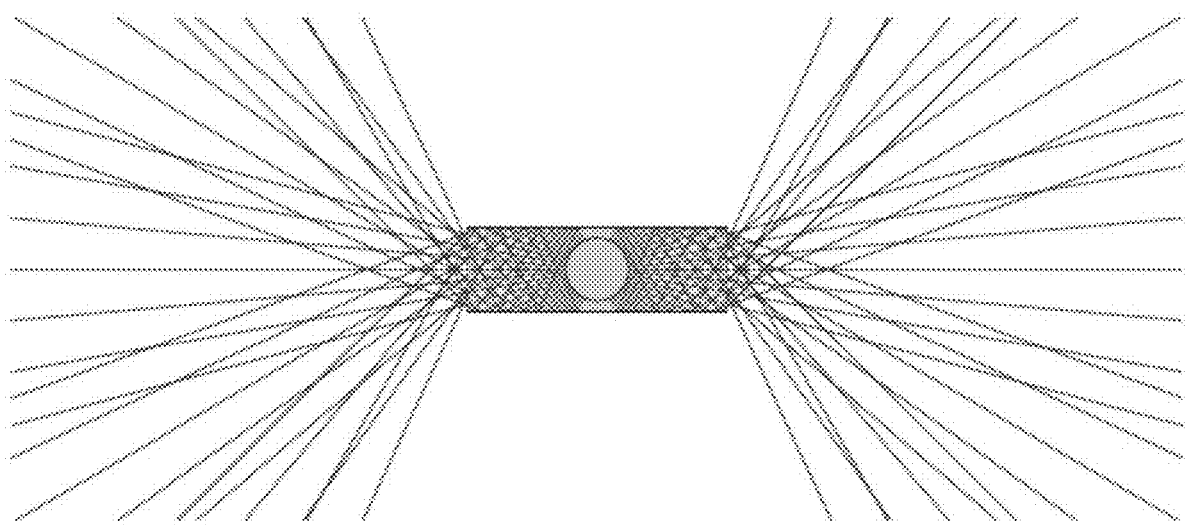
FIG. 4 shows an example of a diagram depicting the field of view of a LiDAR enclosure on a larger distance scale.

FIG. 4 shows an example of a diagram depicting the field of view of a LiDAR enclosure on a larger distance scale. The LiDAR enclosure preserves most of the field of view of the LiDAR enclosure except for the dead zone.

Example of Operation of a LiDAR Unit in a LiDAR Enclosure

The examples described below are intended to be examples of the embodiments disclosed herein, and are not intended to be limiting.

Figure 5:
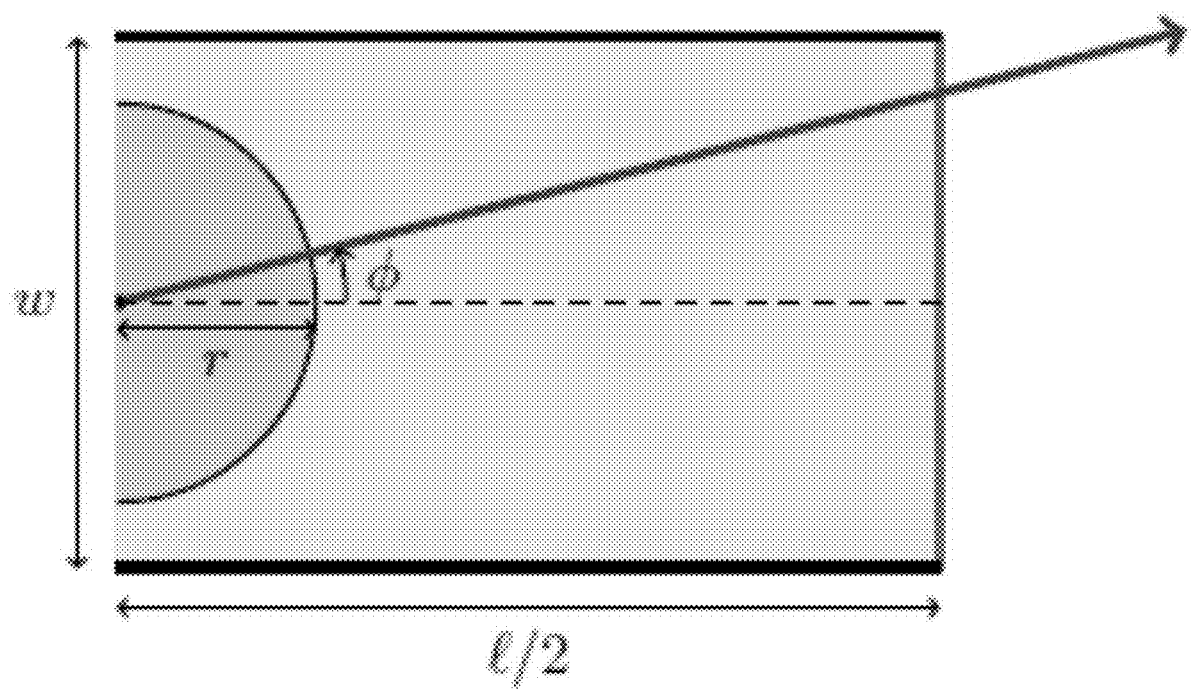
FIG. 5 shows an example of a top-down view of a LiDAR enclosure showing a laser beam path that is not reflected by the reflective surfaces. The azimuth angle $\phi$ is defined as shown.

A LiDAR enclosure operates by redirecting laser light pulses using sets of parallel reflective surfaces. Using simple geometry the effects of the enclosure on the LiDAR data can be understood and utilized. FIG. 5 shows an example of a top-down view of a LiDAR enclosure showing a laser beam path that is not reflected by the reflective surfaces. The azimuth angle $\phi$ is defined as shown. The following analysis will be valid only for angles in the same quadrant as $\phi$ but can be extended to angles in other quadrants.

Figure 6:
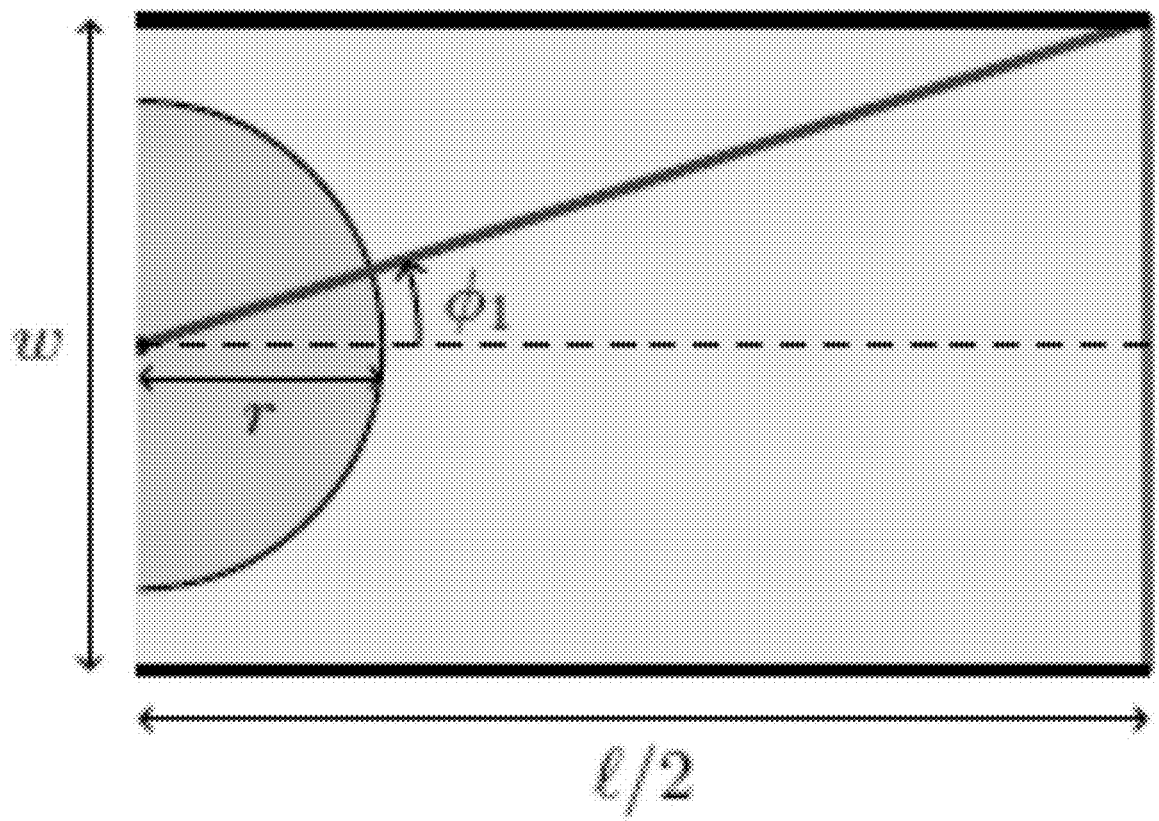
FIG. 6 shows an example of a top-down view of a LiDAR enclosure showing the minimum azimuth angle for at least one reflection of the laser beam before escaping ($\phi_1$).

FIG. 6 shows an example of a top-down view of a LiDAR enclosure showing the minimum azimuth angle for at least one reflection of the laser beam before escaping ($\phi_1$). Laser emissions at azimuth angles between 0 and $\phi_1$ are not reflected. It is straightforward to see that $$\phi_1 = \arctan\left(\frac{w}{\ell}\right). \tag{1}$$

Similarly, there is a minimum angle $\phi_2$ at which point the laser beam is reflected twice before exiting the enclosure.

Figure 7:
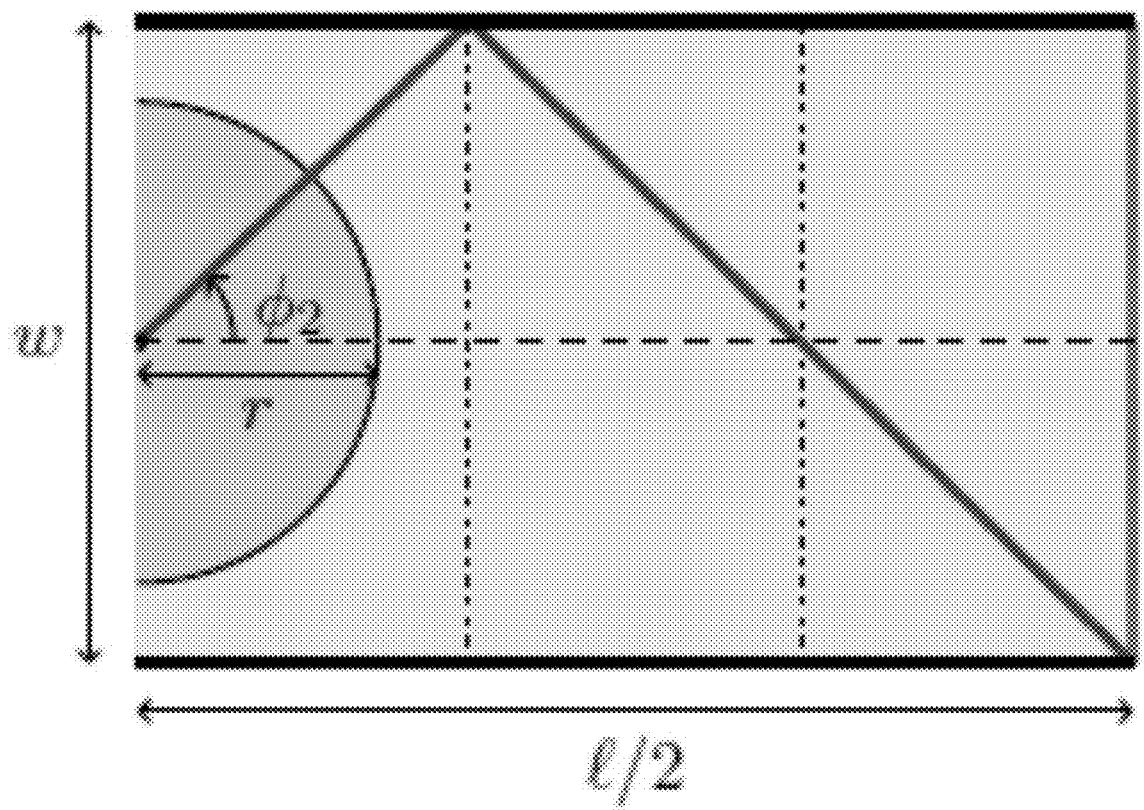
FIG. 7 shows an example of a top-down view of a LiDAR enclosure showing the minimum azimuth angle for at least two laser beam reflections before escaping ($\phi_2$).

FIG. 7 shows an example of a top-down view of a LiDAR enclosure showing the minimum azimuth angle for at least two laser beam reflections before escaping ($\phi_2$). The geometry in FIG. 7 shows that $$\phi_2 = \arctan\left(\frac{3w}{\ell}\right). \quad (2)$$

The general formula for the minimum angle for k reflections is $$\phi_k = \arctan\left(\frac{(2k-1)w}{\ell}\right). \quad (3)$$

In other words, a laser emission at azimuth angle $\phi$ will reflect k times if it is in the range $$\arctan\left(\frac{(2k-1)w}{\ell}\right) < \phi < \arctan\left(\frac{(2k+1)w}{\ell}\right). \quad (4)$$

Equivalently, equation (4) can be used to calculate k directly from $\phi$:

$$k(\phi, \ell, w) = \left\lfloor \frac{1}{2} + \frac{\ell}{2w}\tan\phi \right\rfloor \quad (5)$$

A laser beam that is reflected in a LiDAR enclosure changes its apparent point of origin and may change the exiting azimuth angle as well. Assuming the laser beam then reflects off a point in space (the "detected point"), the apparent position of the detected point needs to be corrected to the true position.

Figure 8:
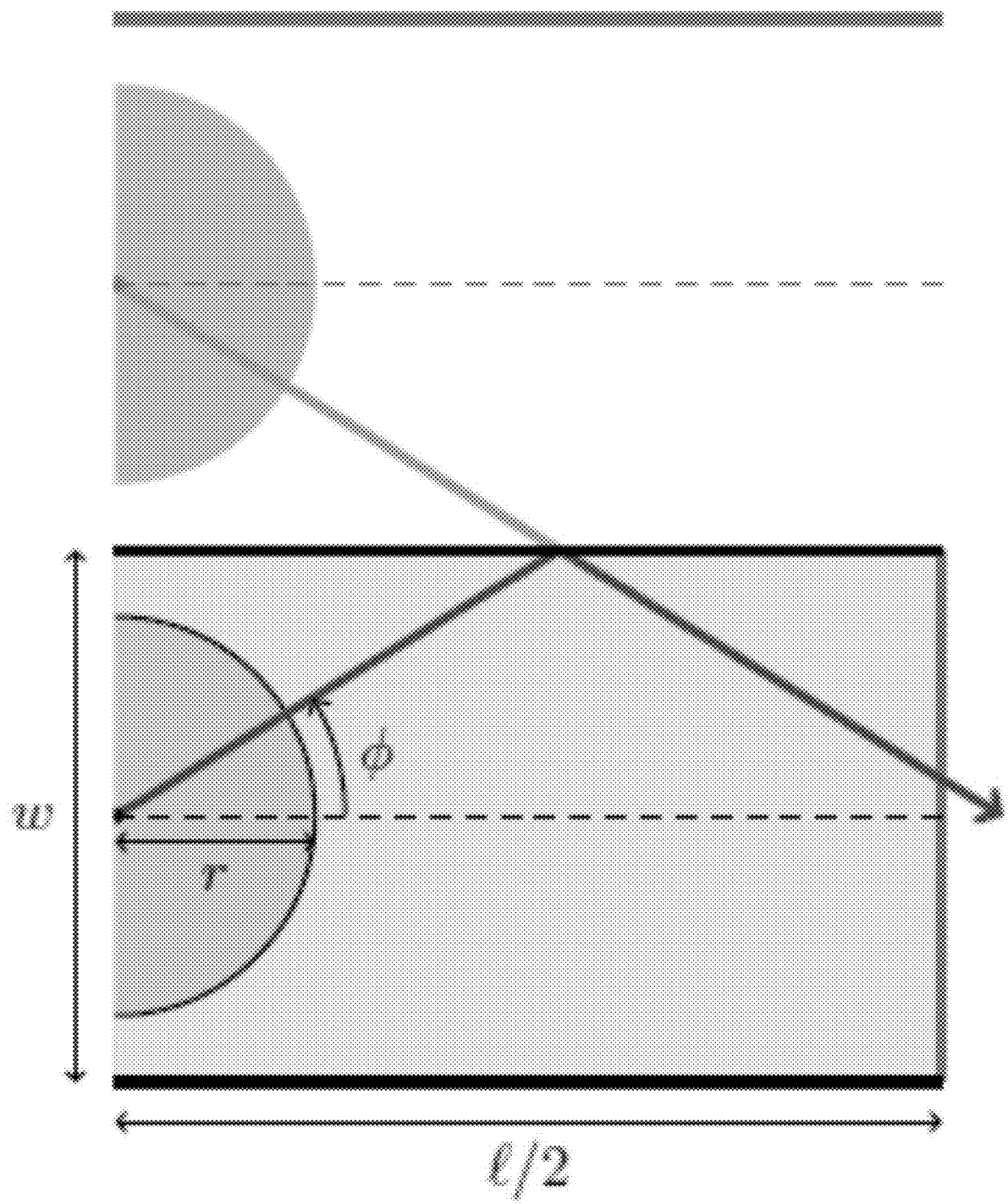
FIG. 8 shows an example of a top-down schematic illustration of a LiDAR enclosure showing the translation in the apparent origin of a laser beam that occurs when the laser beam reflects once before exiting the enclosure.

To correct for the case of one reflection note that after one reflection the exiting azimuth angle changes from +$\phi$ to −$\phi$ and the apparent origin of the laser beam is w in front of the true origin. This shift in the azimuth angle and apparent origin is depicted in FIG. 8. If the range in the xy-plane measured at angle $\phi$ is $\rho_{xy}$, the apparent position of the detected point is $(x,y)=(\rho_{xy} \cos \phi, \rho_{xy} \sin \phi)$, but its true position is (x, w−y). (For this discussion the x-axis points to the right, the y-axis points up, and the origin is the center of the LiDAR unit.)

Figure 9:
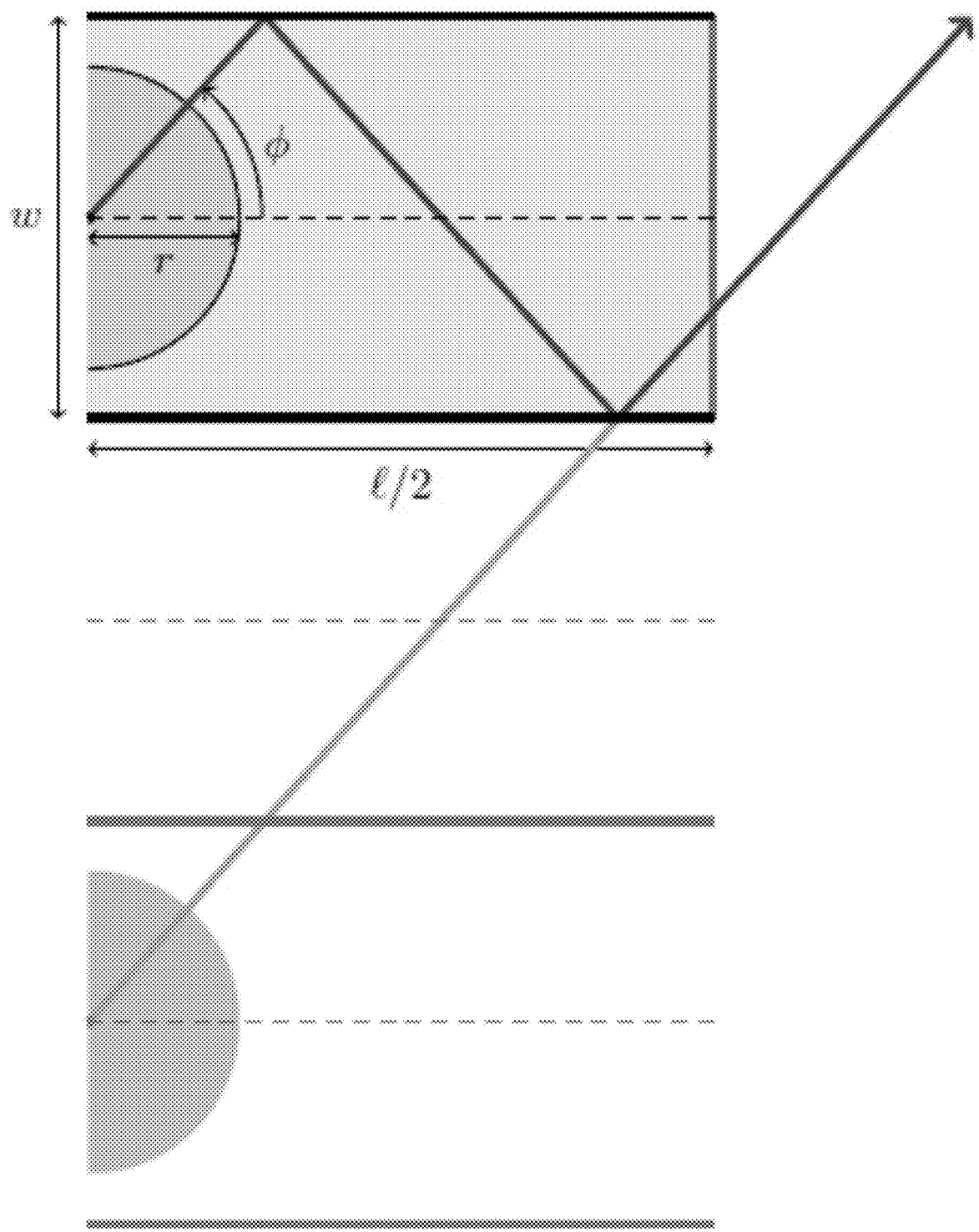
FIG. 9 shows an example of a top-down schematic illustration of a LiDAR enclosure showing the translation in the apparent origin of a laser beam that occurs when the laser beam reflect twice before exiting the enclosure.

To correct for two reflections, the shift in the apparent origin of the laser beam is −2w but the exiting azimuth angle does not change (see FIG. 9). In this case the true position of the detected point is (x, −2w+y).

In general, for k reflections, the apparent position of the detected point is corrected from $(x, y)=(\rho_{xy} \cos \phi, \rho_{xy} \sin \phi)$ in the following way:

$$\begin{pmatrix} x \\ y \end{pmatrix} \rightarrow \begin{pmatrix} x \\ (-1)^k(y - kw) \end{pmatrix}. \quad (6)$$

Returned laser intensities will be affected by their interactions with the LiDAR enclosure, but these intensities can be corrected. If the end windows have transmittance T (which will in general have a dependence on $\phi$ and the elevation angle $\theta$) and the reflective surfaces have reflectance R, then the measured intensity of a laser beam reflected k times relative to the intensity without a LiDAR enclosure is $$\frac{I}{I_0} = R^{2k}T^2(\phi, \theta). \quad (7)$$

This formula results from counting the reflections (k) and transmissions (1) encountered by both the outgoing and incoming laser beam paths. Materials for the reflective surfaces and windows can be chosen based on whether the losses are acceptable, given the maximum number of reflections for the enclosure.

Figure 10:
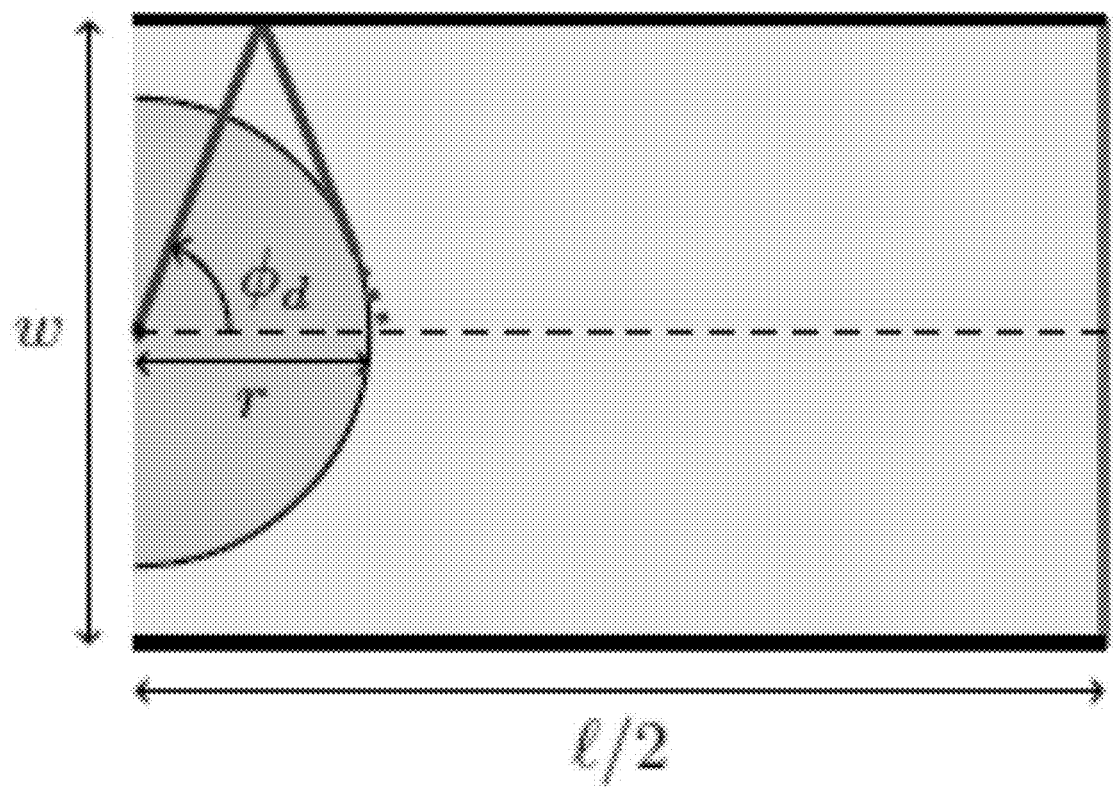
FIG. 10 shows an example of a top-down schematic illustration of a LiDAR enclosure showing the minimum azimuth angle $\phi_d$ at which the lasers reflect onto the LiDAR unit.

There is a maximum azimuth angle for laser beams that can escape the LiDAR enclosure, since above a certain azimuth angle the laser beam will be reflected back onto the LiDAR unit itself (see FIG. 10). This creates a dead zone on both sides of the LiDAR enclosure. From geometric considerations, this maximum azimuth angle can be calculated:

$$\phi_d = \arccos\left(\frac{r}{w}\right), \quad (8)$$

where it has been assumed that light reflecting into the LiDAR unit would be disregarded.

The total width of the dead zones is $$\Delta\phi_d = 2\left(\frac{\pi}{2} - \phi_d\right) = \pi - 2\arccos\left(\frac{r}{w}\right), \quad (9)$$

due to left-right symmetry. Since w≥2r, the largest value that $\Delta\phi_d$ can take is when w=2r:

$$\Delta\phi_{d,max} = \pi - 2\arccos\left(\frac{1}{2}\right) = \pi - \frac{2\pi}{3} = \frac{\pi}{3} = 60° \quad (10)$$

In most cases, the dead zones should be minimized. That can be achieved by increasing w, which may be subject to other constraints. In addition, if end windows are present, the maximum azimuth angle may become limited by the increasing strength of internal reflections at larger incidence angles.

The previously described formulas can be implemented using the following method, which corrects a LiDAR detected point location (x, y) and measured intensity I for the effect of a LiDAR enclosure with length $\ell$, width w, LiDAR radius r, reflective surface reflectance R, and window transmittance T (neglecting any angular dependence of T):
1. Transform (x, y) into the upper-right quadrant.
2. Calculate $\phi$=arctan(y/x).
3. Reject the point if $\phi \geq \phi_d(r, w)$ (equation (8)).
4. Otherwise, calculate the number of reflections k($\phi, \ell$,w) (equation (5)).
5. Correct y to $(-1)^k$(y−kw) (equation (6)).
6. Correct I to $I/R^{2k}T^2$ (equation (7)).
7. Transform (x, y) back into the original quadrant.

This method can be implemented in different software packages. For example, this method is implemented in the following Python code (the function azimuthal_correction contains the complete algorithm):

```
import numpy as np
def position_correction(x, y, length, width, radius):
    # transform x and y to upper-right quadrant
    x_sign = np.sign(x)
    y_sign = np.sign(y)
    x = x * x_sign
    y = y * y_sign
    phi = np.arctan2(y, x)
    # reject if this angle is in the dead zone
    phi_d = np.arccos(radius / width)
    if phi > phi_d:
        return 0, 0, 0, False
    # calculate number of reflections
    k = int(np.floor(0.5 + length * y / (2 * width * x)))
    # position correction
    x_corr = x
    y_corr = (-1)**k * (y - k * width)
    # convert back to original quadrant
    x_corr *= x_sign
    y_corr *= y_sign
    return x_corr, y_corr, k, True
def intensity_correction(i, k, R, T):
    return i / (R**(2 * k) * T**2)
def azimuthal_correction(x, y, i, length, width, radius, R, T):
    """Correct y and intensity for azimuthal reflections only."""
    x_corr, y_corr, k, valid = position_correction(x, y, length, width,
radius)
    if not valid:
        return 0, 0, 0, False
    i_corr = intensity_correction(i, k, R, T)
    return x_corr, y_corr, i_corr, True
```

Figure 11A:
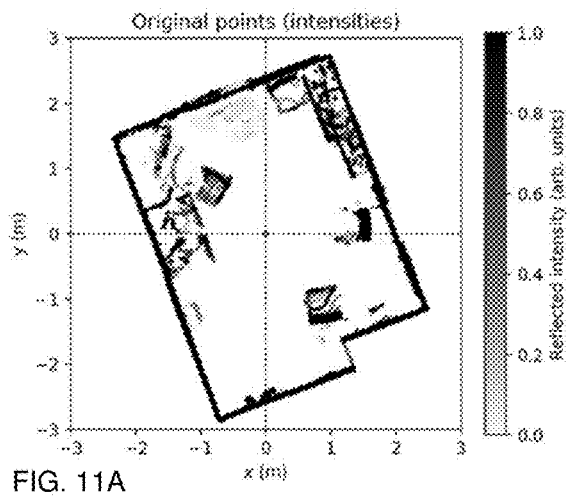
FIGS. 11A-11E show examples of the simulated effects of a LiDAR enclosure on LiDAR data and the correction of the LiDAR data.
Figure 11B:
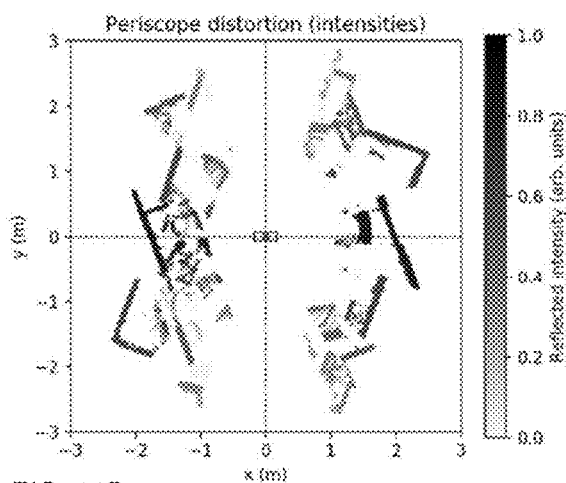
Figure 11C:
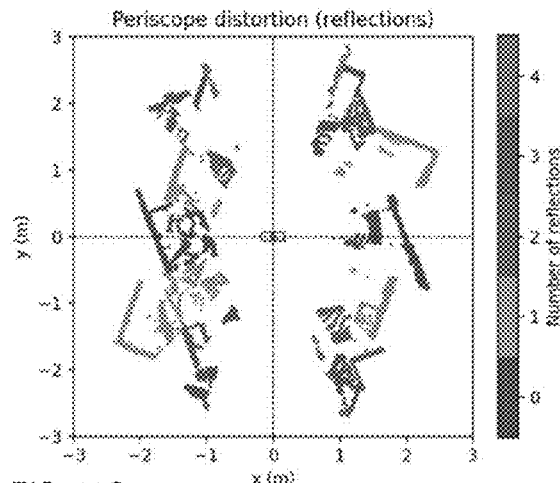
Figure 11D:
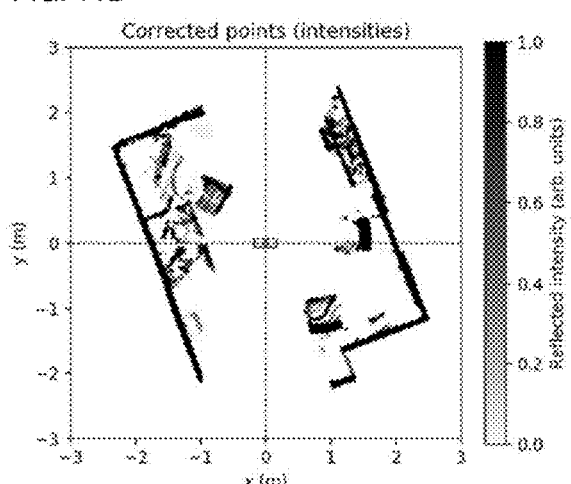
Figure 11E:
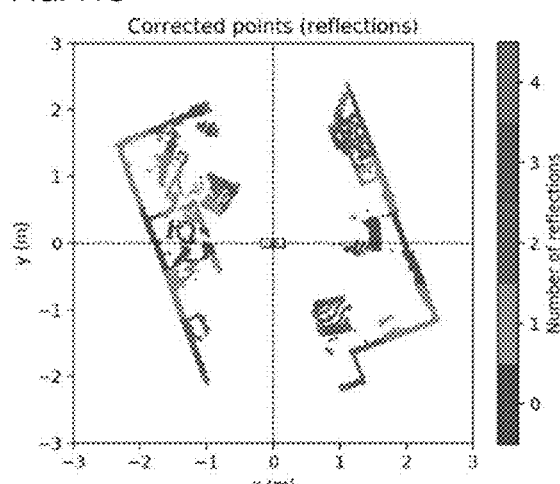

The effects of a LiDAR enclosure on actual LiDAR data and the resulting correction are shown in FIGS. 11A-11E. FIGS. 11A-11E show a simulated effect of a LiDAR enclosure on data taken with a Velodyne HDL-32E (r=4.3 cm) LiDAR (Velodyne LiDAR, San Jose, Calif.). The LiDAR enclosure dimensions used were $\ell$=35 cm and w=12 cm, with R=0.85 (i.e., aluminum), and T=0.90. FIG. 11A shows the original data used for this simulation—the LiDAR was in the center of a small room with chairs, tables, and other clutter. The LiDAR enclosure shifts the positions of the points and lowers their reflected intensities (FIGS. 11B and 11C). The algorithm described above restores the correct point positions and intensities (FIGS. 11D and 11E). One difference between the corrected point cloud and the original point cloud is the loss of points in the dead zone.

Figure 12:
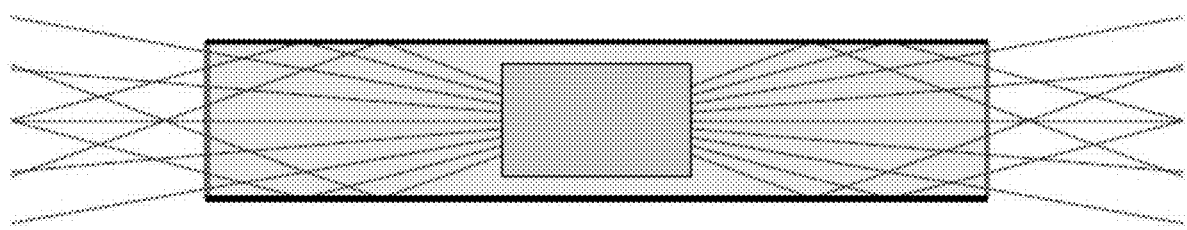
FIG. 12 shows an example of a cross-sectional schematic illustration of a LiDAR enclosure showing that when the top and the bottom sides of a LiDAR enclosure are reflective, then laser beam paths at different elevation angles will be reflected in an analogous manner to the azimuthal reflections from the side reflective surfaces.

Depending on the dimension of the LiDAR enclosure and the elevation range of the laser of the LiDAR unit, there may also be reflections off the top and bottom surfaces of the enclosure (see FIG. 12) when the top and bottom surfaces are reflective. The corrections in the elevation direction are analogous to the corrections in the azimuthal direction, including the possibility of a dead zone in the case of a LiDAR system with a large elevation opening.

For a detected point at range $\rho$ and elevation angle $\theta$, the quantity ($\rho \cos \theta$, $\rho \sin \theta$)=($\rho_{xy}$, z) is analogous to (x, y) in equation (6), while the horizontal distance to exit the enclosure increases from $\ell$/2 to $\ell$/(2 cos $\phi$). Therefore, the correction to z can be obtained from the correction to y by substituting h for w, $\ell$ sec $\phi$ for $\ell$, and the number of elevation reflections $k_\theta$ for k. If it is determined when applying the reconstruction algorithm that there are $k_\phi$ reflections off the side reflective surfaces and $k_\theta$ reflections on the top and bottom reflective surfaces, then the intensity correction (equation (7)) uses the total number of reflections $k=k_\phi+k_\theta$.

The following method is a modified version of the method described above, with elevation corrections also being made:

1. Transform (x, y, z) into the octant where all three are positive.
2. Calculate $\theta=\arctan(z/\sqrt{x^2+y^2})$.
3. Calculate $\phi=\arctan(y/x)$.
4. Reject the point if $\phi \geq \phi_d(r, w)$ (equation (8)).
5. Otherwise, calculate the number of azimuthal reflections $k_\phi=k(\phi, \ell, w)$ (equation (5)).
6. Correct y to $(-1)^{k_\phi}(y-k_\phi w)$ (equation (6)).
7. Calculate the number of elevation reflections $k_\theta=k(\theta, \ell, h)$ (equation (5)).
8. Correct z to $(-1)^{k_\theta}(z-k_\theta h)$ (equation (6)).
9. Correct I to $I/R^{2(k_\phi+k_\theta)}T^2$ (equation (7)).
10. Transform (x, y, z) back into the original octant.

This method is implemented in the following Python function:

```
def full_correction(x, y, z, i, length, width, height, radius, R, T):
    """Correct y, z, and intensity for azimuthal and elevation
reflections."""
    # perform azimuthal correction
    _, y_corr, k_phi, valid = position_correction(x, y, length, width,
radius)
    # reject if the azimuth is in the dead zone
    if not valid:
        return 0, 0, 0, 0, False
    # perform elevation correction
    r_xy = np.sqrt(x**2 + y**2)
    z_corr, k_theta, _ = position_correction(r_xy, z, length, height, 0)
    # perform intensity correction
    i_corr = intensity_correction(i, k_phi + k_theta, R, T)
    return x, y_corr, z_corr, i_corr, True
```

This method and code ignore any dead zone in the elevation angle, but that may not be the case in general.

If a LiDAR enclosure does not have top and bottom reflective surfaces, then another type of dead zone would occur when a beam becomes incident on those surfaces. This situation occurs when $$\tan|\theta| \geq \frac{h}{\ell \sec\phi} \text{ or} \quad (11)$$

$$|\theta| \geq \arctan\left(\frac{h\cos\phi}{\ell}\right) \equiv \theta_d(\phi). \quad (12)$$

In the methods described above, the calculations are described with respect to a two-dimensional or a three-dimensional Cartesian coordinate system. The calculations in the methods could also be performed in a polar coordinate system or a spherical coordinate system. For example, when using a polar coordinate system, an azimuthal angle and range would be used in the calculations. For example, when using a spherical coordinate system, an azimuthal angle, an elevation angle, and range would be used in the calculations.

Figure 13B:
FIG. 13B shows an example of a reconstructed point cloud after the LiDAR enclosure reconstruction method was applied to original point cloud. The view shown in FIG. 13B is a top-down view showing the room in which the testing was performed.
Figure 13A:
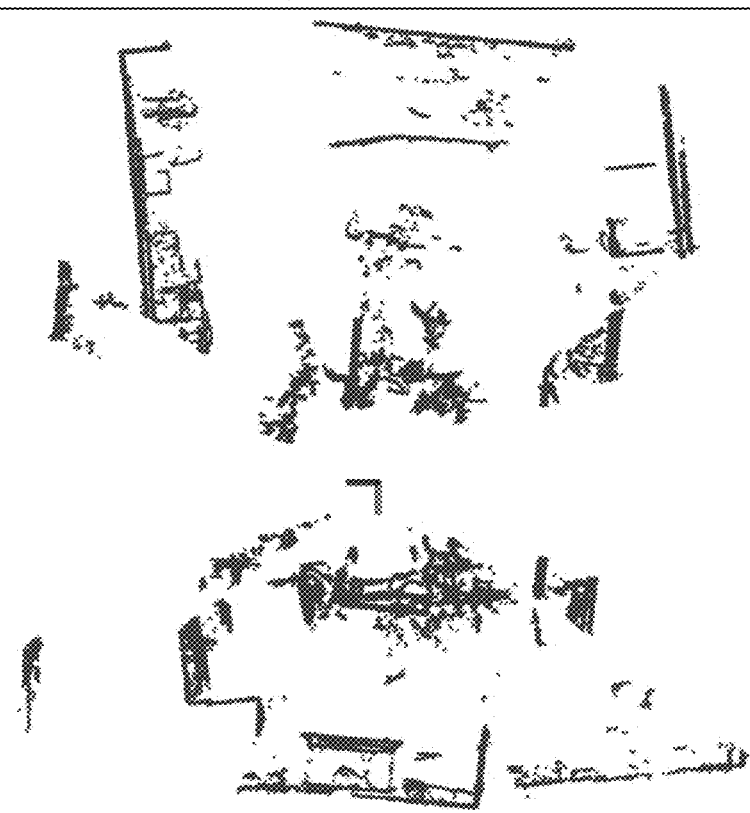
FIG. 13A shows an example of an original point cloud measured by a prototype LiDAR enclosure with a LiDAR unit.
Figure 15:
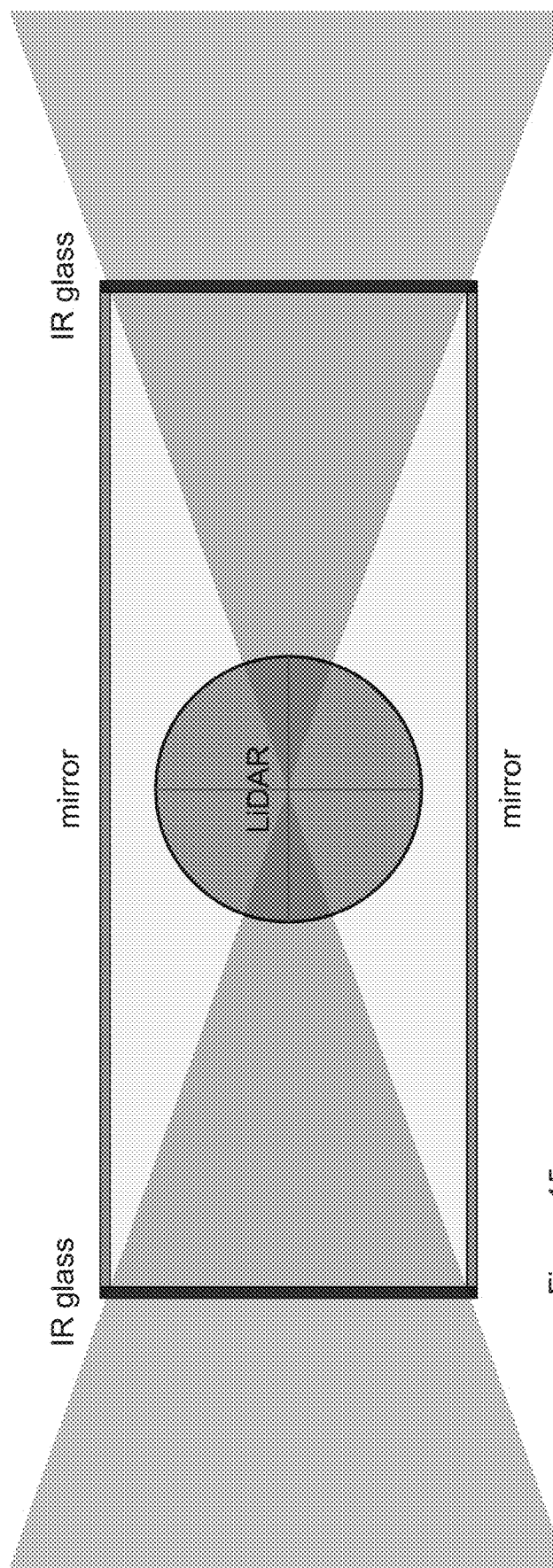
FIG. 15 shows an example of a top-down schematic illustration of a LiDAR enclosure with no reflections of the laser beams.
Figure 16:
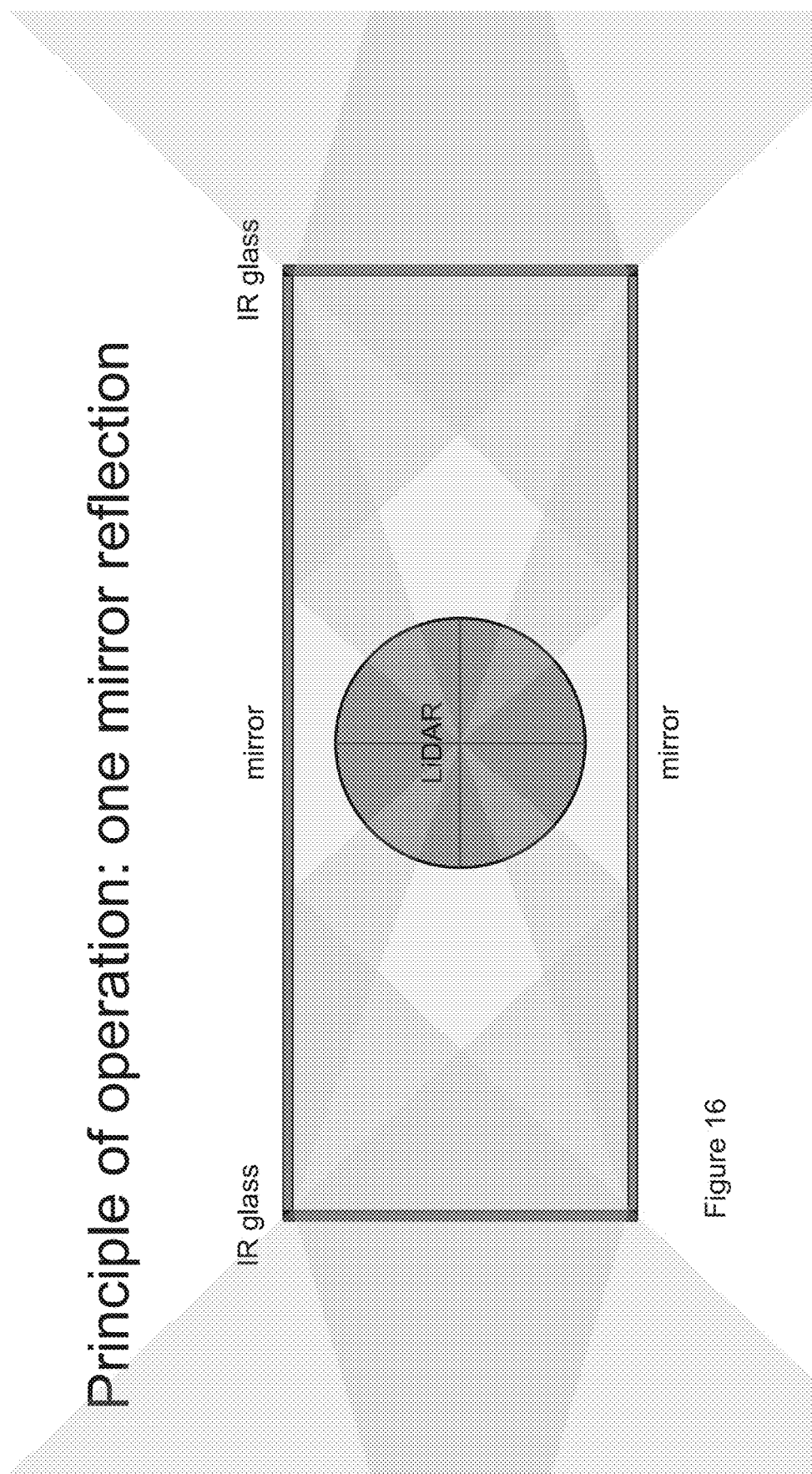
FIG. 16 shows an example of a top-down schematic illustration of a LiDAR enclosure with one reflection of the laser beams.
Figure 17:
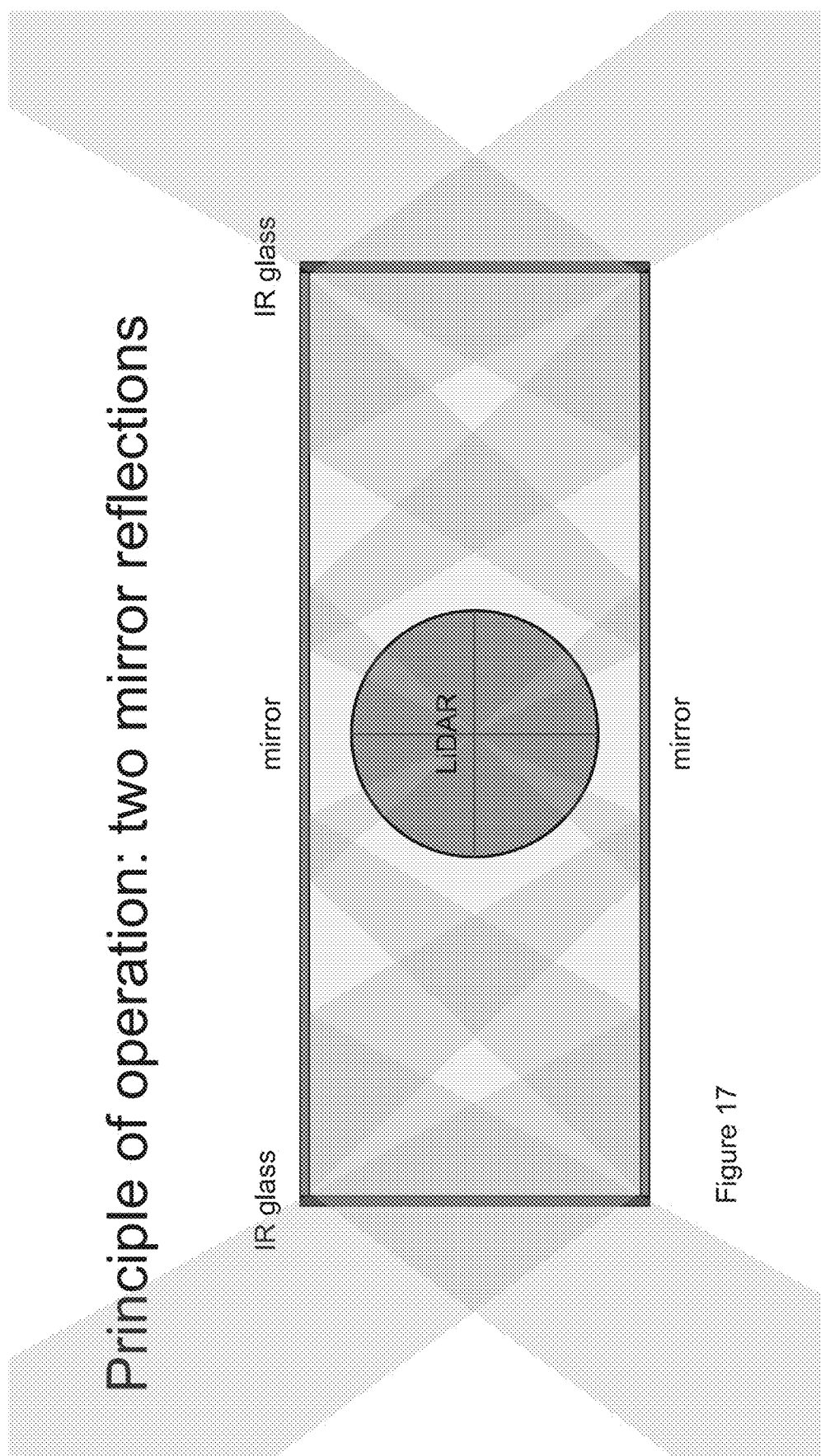
FIG. 17 shows an example of a top-down schematic illustration of a LiDAR enclosure with two reflections of the laser beams.
Figure 18:
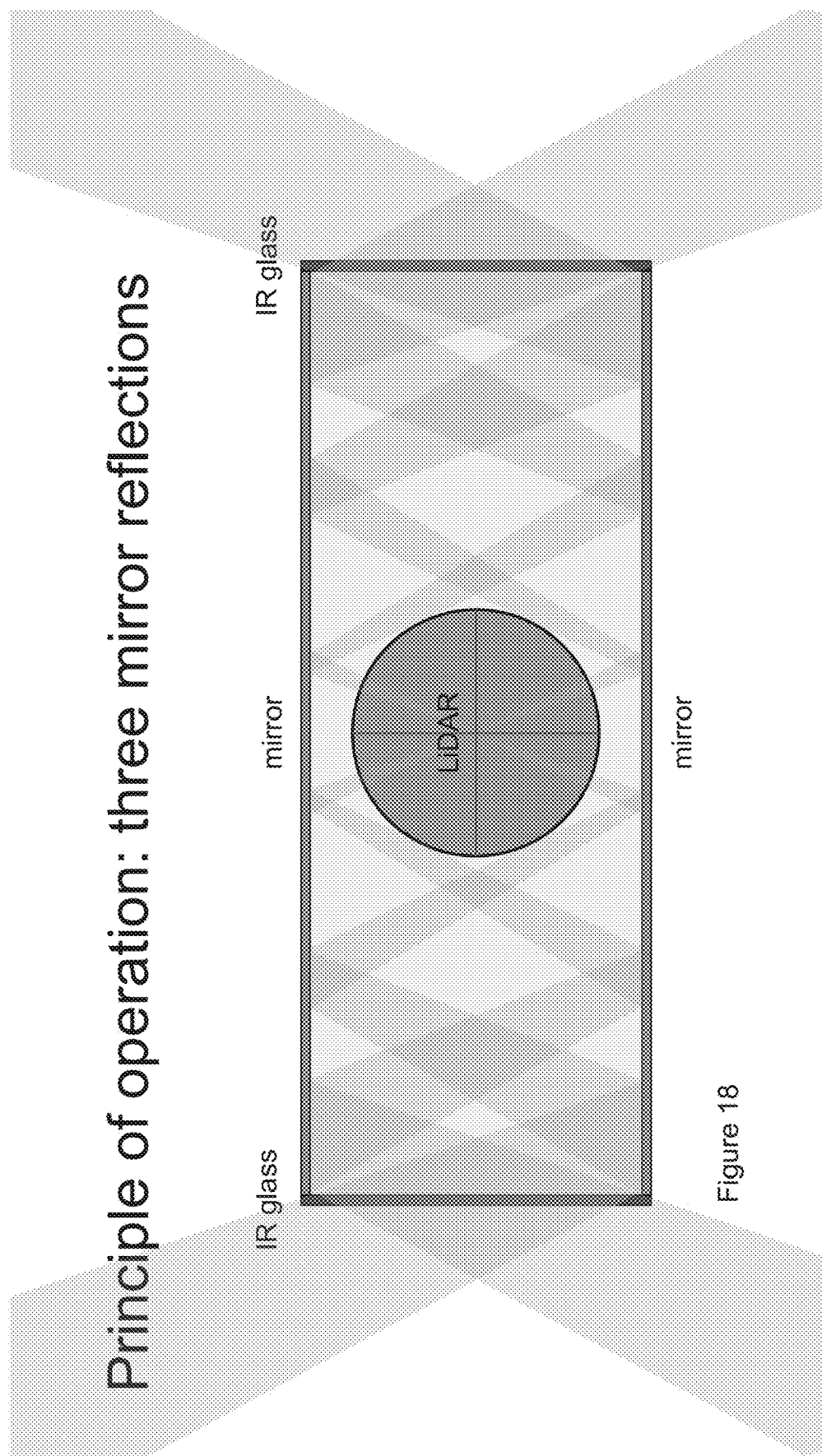
FIG. 18 shows an example of a top-down schematic illustration of a LiDAR enclosure with three reflections of the laser beams.

A working prototype of a LiDAR enclosure was built and tested. Aluminum disposed on acrylic substrates was used for the LiDAR enclosure, and a Velodyne VLP-16 was used for the LiDAR unit. For example, aluminum can be deposited on the acrylic substrates. The reflective aluminum surfaces were disposed on the interior of the LiDAR enclosure to avoid absorption by the reflective surface substrate (e.g., acrylic), which can be substantial. With these types of reflective surfaces, laser beams from the LiDAR unit are only reflected by the aluminum surface and are not transmitted through the reflective surface substrate, reflected by the aluminum surface, and then transmitted back through the reflective surface substrate. FIGS. 13A and 13B show the original and reconstructed point clouds using the method that includes elevation reflections.

Method

Figure 19:
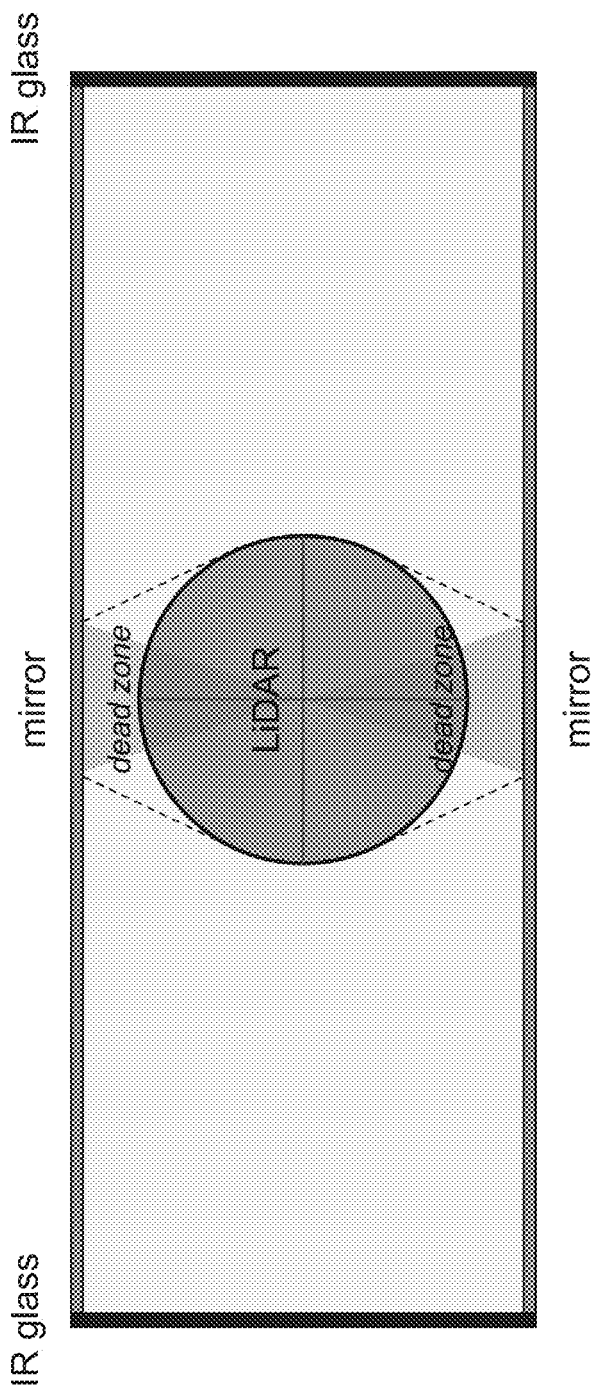
FIG. 19 shows an example of a top-down schematic illustration of a LiDAR enclosure illustrating the azimuth dead zone.

FIGS. 14-18 show examples of top-down schematic illustrations of a LiDAR enclosure, with each figure showing a different number of reflections of the laser beams. FIG. 19 shows an example of a top-down schematic illustration of a LiDAR enclosure illustrating the azimuth dead zone.

Figure 20:
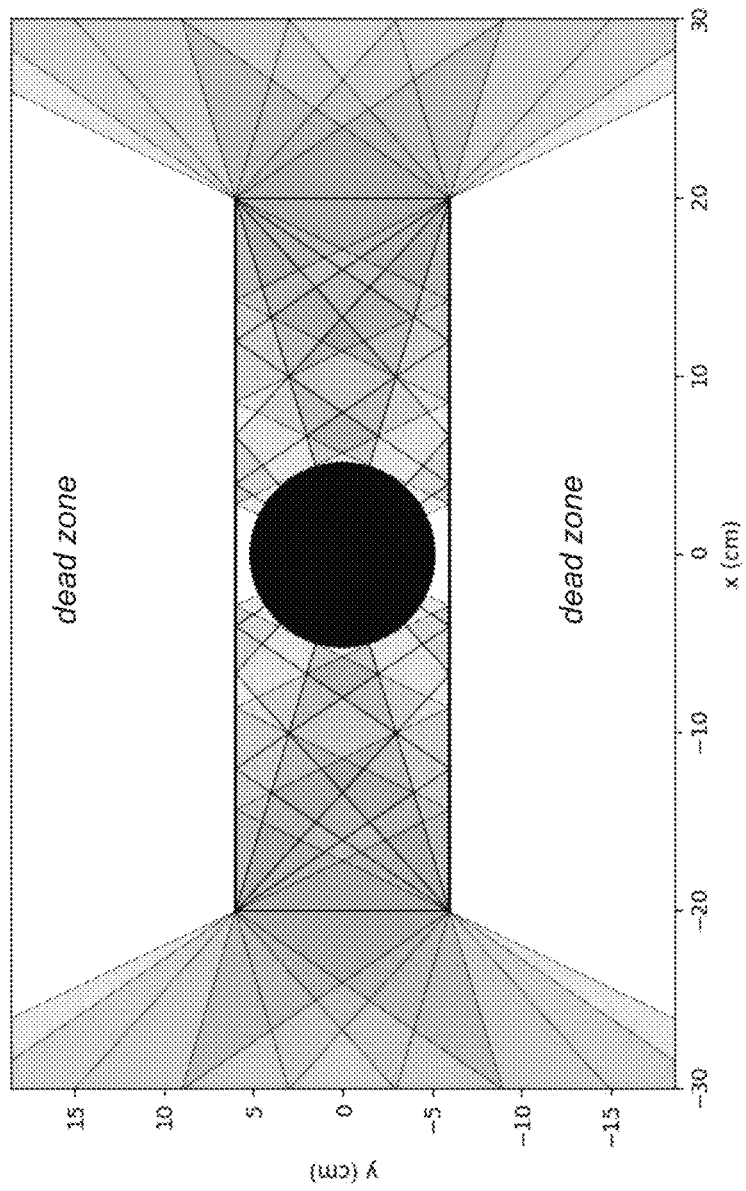
FIGS. 20-22 show examples of top-down schematic illustrations of a LiDAR enclosure illustrating that reflections of the laser beams cover most azimuth angles.
Figure 21:
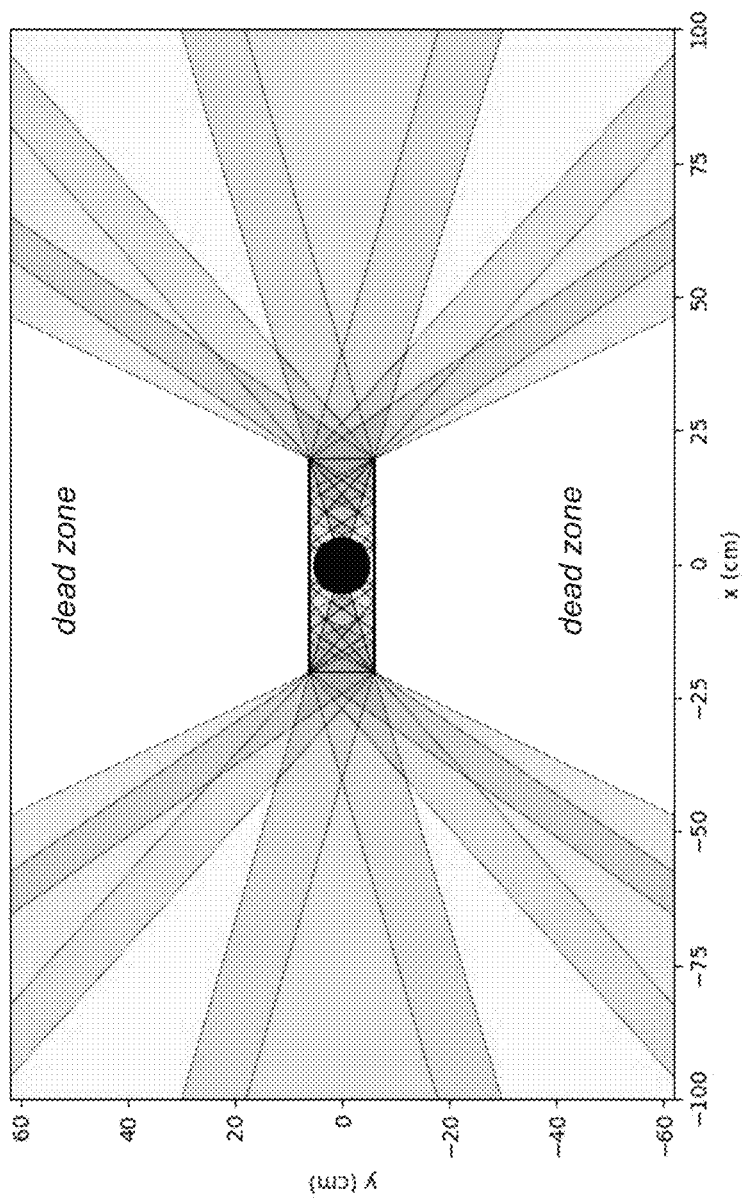
Figure 22:
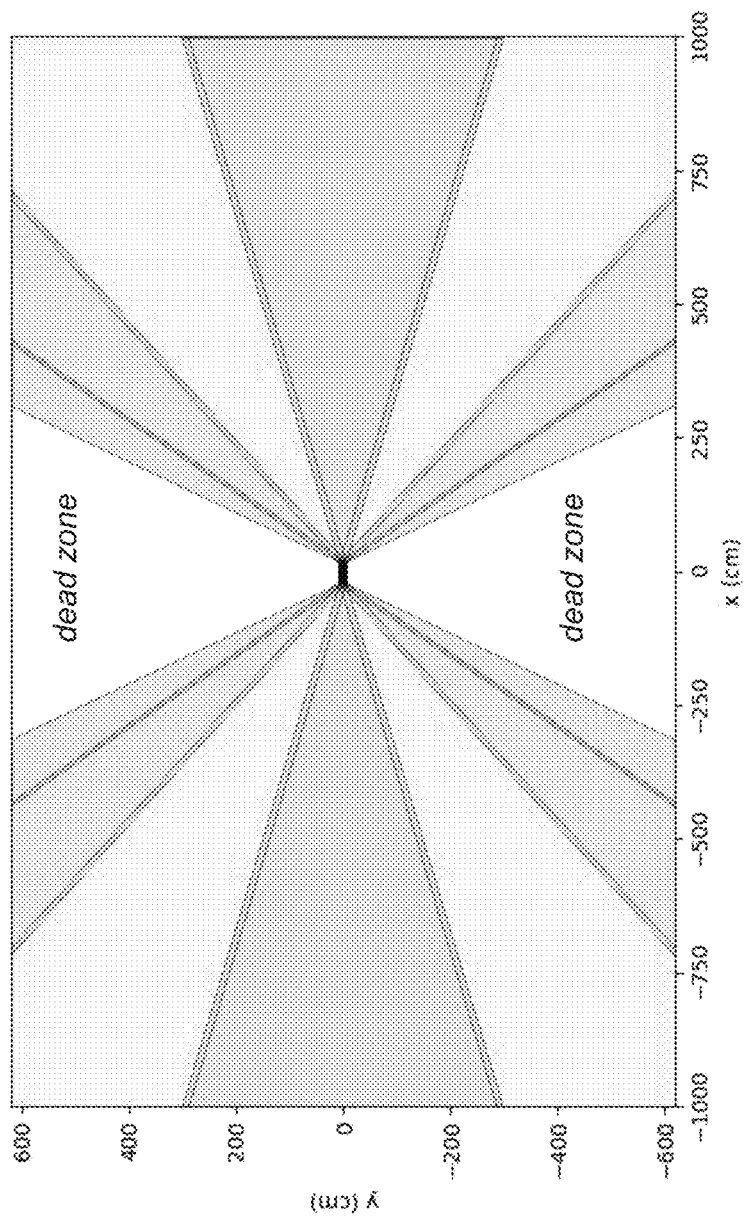

FIGS. 20-22 show examples of top-down schematic illustrations of a LiDAR enclosure illustrating that reflections of the laser beams cover most azimuth angles.

Figure 23:
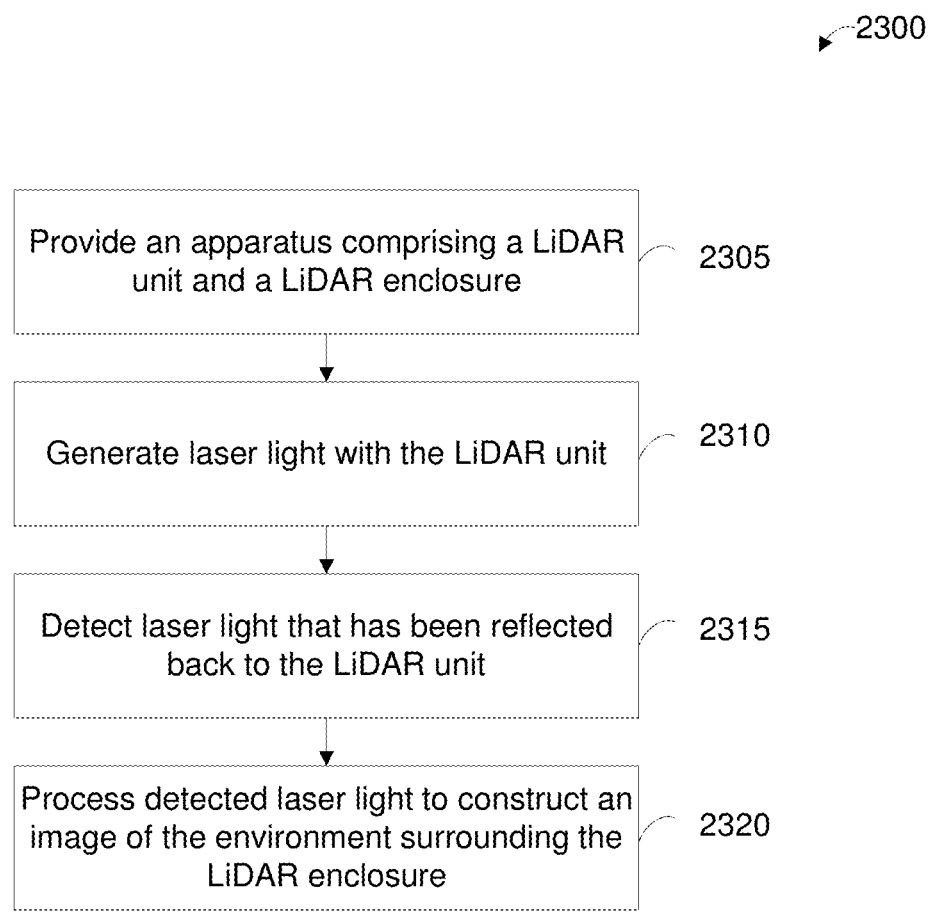
FIG. 23 shows an example of flow diagram illustrating a method of operation of a LiDAR enclosure.

FIG. 23 shows an example of flow diagram illustrating a method of operation of a LiDAR enclosure. Starting at block 2305 of the method 2300, a LiDAR enclosure with a LiDAR unit attached to the mounting area of the LiDAR enclosure is provided. The LiDAR enclosure and the LiDAR unit may be any of the LiDAR enclosures and LiDAR units described herein.

At block 2310, laser light is generated with the LiDAR unit. That is, a laser system in the LiDAR unit generates laser light and optical components within the LiDAR unit direct the laser light so that it exits the LiDAR unit.

At block 2315, laser light that has interacted with environment surrounding the LiDAR enclosure and that has been reflected back to the LiDAR unit is detected by the LiDAR unit. Characteristics of detected laser light may include azimuth angle, elevation angle, distance from point where the laser light was reflected (i.e., range), and intensity of the laser light (i.e., reflected intensity or reflectivity).

At block 2320, the detected laser light is processed to construct an image of the environment surrounding the LiDAR enclosure. In some embodiments, the processing of the detected laser light is performed with processing device (e.g., a processor or a computer system). The processing device will typically include one or more memory devices and one or more processors.

Figure 24:
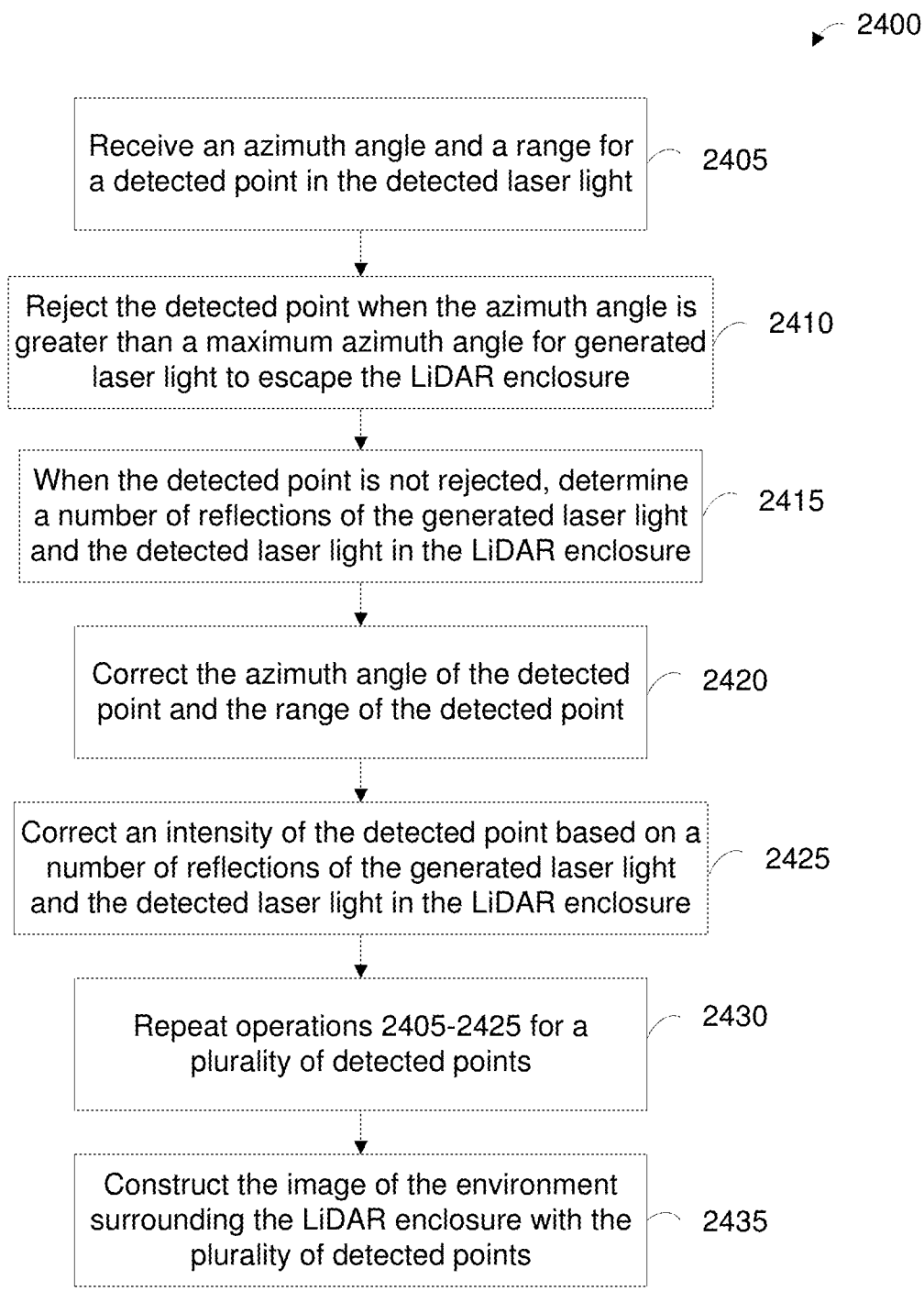
FIG. 24 shows an example of flow diagram illustrating a method of processing detected laser light to construct an image of the environment surrounding the LiDAR enclosure.

FIG. 24 shows an example of flow diagram illustrating a method of processing detected laser light to construct an image of the environment surrounding the LiDAR enclosure. The method 2400 shown in FIG. 24 is described using a polar coordinate system. The method 2400 may be used for a LiDAR unit (in a LiDAR enclosure) that generates an azimuth angle for a detected point and not an elevation angle for the detected point. The method 2400 also may be used for a LiDAR unit (in a LiDAR enclosure) that generates an azimuth angle and an elevation angle for a detected point, so long as reflections in elevation angle do not occur (i.e., the surfaces 106 and 108 of the LiDAR enclosure 100 shown in FIGS. 1A-1C are either non-reflecting or not illuminated by the laser of the LiDAR unit 115).

Starting at block 2405 of the method 2400, an azimuth angle and a range for a detected point in the detected laser light is received from the LiDAR unit. The range for the detected point is based on the timing from when the laser light is generated with the LiDAR unit (e.g., operation 2310 in FIG. 23) to when the laser light that has interacted with environment surrounding the LiDAR enclosure and that has been reflected back to the LiDAR unit is detected by the LiDAR unit (e.g., operation 2315 in FIG. 23).

At block 2410, the detected point is rejected when the azimuth angle is greater than a maximum azimuth angle for generated laser light to escape the LiDAR enclosure. In some embodiments (e.g., when using a LiDAR unit that generates an azimuth angle and an elevation angle), the detected point is also rejected if the elevation angle is greater than a maximum elevation angle to leave the LiDAR enclosure without intersecting the top of the LiDAR enclosure (106) or if the elevation angle is greater than a maximum elevation angle to leave the LiDAR enclosure without intersecting the bottom of the LiDAR enclosure (108).

At block 2415, when the detected point is not rejected, a number of reflections of the generated laser light and the detected laser light in the LiDAR enclosure is determined. When there are no reflections of the generated laser light and detected laser light in the LiDAR enclosure, operations 2420 and 2425 do not need to be performed. That is, when there are no reflections of the generated laser light and detected laser light in the LiDAR enclosure, the LiDAR unit operates as when it is not positioned in the LiDAR enclosure and no correction of the azimuth angle and the range are necessary.

At block 2420, the azimuth angle of the detected point is corrected to an actual azimuth angle of the detected point and the range of the detected point is corrected to an actual range of the detected point. The range is corrected to the actual range to account for the reflections of the laser light in the LiDAR enclosure. For example, a detected point may appear to have a range that is larger than the actual range due to reflections of the laser light in the LiDAR enclosure.

At block 2425, in some embodiments, an intensity of the detected point is corrected based on a number of reflections of the generated laser light and the detected laser light in the LiDAR enclosure. The intensity of a detected point provides information about the material with which the laser light interacts with and is reflected by. A higher intensity of a detected point implies a higher reflectivity material. Intensity of detected points can be used to provide false color to the detected points, which can help in delineating features in an image generated with the detected points. The intensity correction takes account of the intensity lost on each reflection of the laser light in the LiDAR enclosure. In some embodiments of the method 2400, block 2425 is not performed.

At block 2430, blocks 2405 through 2425 are repeated for a plurality of detected points. At block 2435, the image of the environment surrounding the LiDAR enclosure is constructed with the actual azimuth angle and the actual range of the plurality of detected points.

In some embodiments, before block 2405, the detected point is transformed to a positive quadrant from its original quadrant. Then, after block 2425, the detected point is transformed back to the original quadrant. These operations may make it easier to implement the method 2400.

Figure 25:
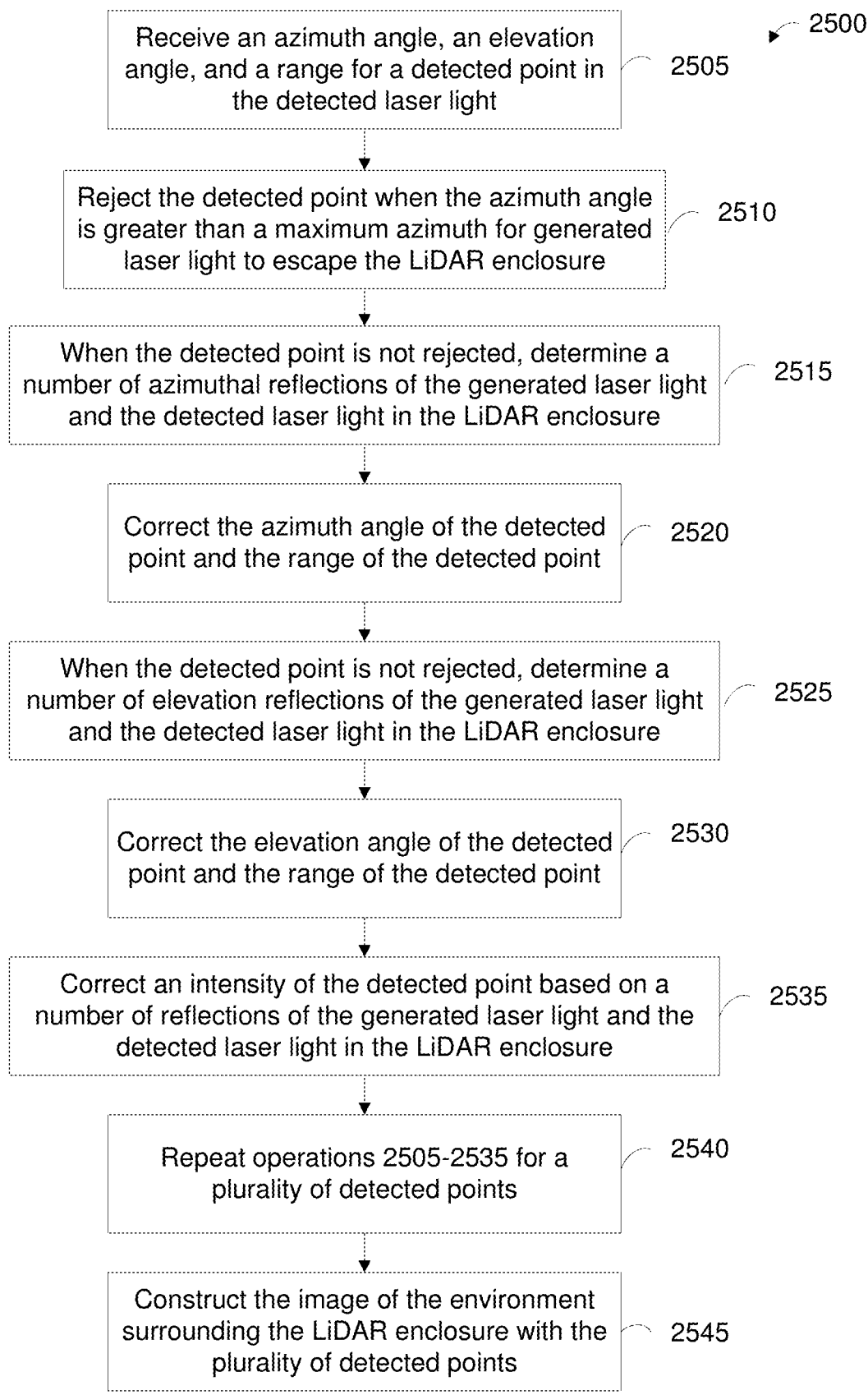
FIG. 25 shows an example of flow diagram illustrating a method of processing detected laser light to construct an image of the environment surrounding the LiDAR enclosure.

FIG. 25 shows an example of flow diagram illustrating a method of processing detected laser light to construct an image of the environment surrounding the LiDAR enclosure. The method 2500 shown in FIG. 25 is described using a spherical coordinate system. The method 2500 can be used for a LiDAR unit (in a LiDAR enclosure) that generates an azimuth angle and an elevation angle for a detected point. In some embodiments, such a LiDAR unit may have elevation angles of about ±30°, about ±15°, about +15°/about −30°, or about +30°/about −15°. The method 2500 accounts for elevation reflections, whereas the method 2400 in FIG. 24 does not. When the method 2500 is used to process detected laser light, the LiDAR enclosure of the LiDAR unit includes a reflective top surface and bottom surface, in addition to the reflective side surfaces.

Starting at block 2505 of the method 2500, an azimuth angle, an elevation angle, and a range for a detected point in the detected laser light are received from the LiDAR unit. At block 2510, the detected point is rejected when the azimuth angle or the elevation angle is greater than a maximum azimuth angle or when the elevation angle is greater than a maximum elevation angle for generated laser light to escape the LiDAR enclosure.

At block 2515, when the detected point is not rejected, a number of azimuthal reflections of the generated laser light and the detected laser light in the LiDAR enclosure is determined. When there are no azimuthal reflections of the generated laser light and detected laser light in the LiDAR enclosure, operation 2520 does not need to be performed. That is, when there are no azimuthal reflections of the generated laser light and detected laser light in the LiDAR enclosure, no correction of the azimuth angle and the range (i.e., range correction of azimuthal reflections) are needed.

At block 2520, the azimuth angle of the detected point is corrected to an actual azimuth angle of the detected point and the range of the detected point is corrected to a corrected range of the detected point. The corrected range of the detected point accounts for azimuthal reflections of the laser light and does not account for elevation reflections, if any, of the laser light.

At block 2525, when the detected point is not rejected, a number of elevation reflections of the generated laser light and the detected laser light in the LiDAR enclosure is determined. When there are no elevation reflections of the generated laser light and detected laser light in the LiDAR enclosure, operation 2530 does not need to be performed. That is, when there are no elevation reflections of the generated laser light and detected laser light in the LiDAR enclosure, no correction of the elevation angle and the range (i.e., range correction of elevation reflections) are needed.

At block 2530, the elevation angle of the detected point is corrected to an actual elevation angle and the corrected range of the detected point is corrected to an actual range of the detected point. The actual range of the detected point accounts for azimuthal reflections and elevation reflections of the laser light.

At block 2535, in some embodiments, an intensity of the detected point is corrected based on a number of reflections of the generated laser light and the detected laser light in the LiDAR enclosure. The number of reflections of the generated laser light and the detected laser light in the LiDAR enclosure includes the number of azimuthal reflections and the number of elevation reflections. In some embodiments of the method 2500, block 2535 is not performed. For example, block 2535 is not performed when the intensity corrections are not of interest or not needed by an end user of a LiDAR unit in a LiDAR enclosure. As another example, block 2535 is not performed when there are no reflections of the generated laser light and the detected laser light in the LiDAR enclosure for a detected point.

At block 2540, blocks 2505 through 2535 are repeated for a plurality of detected points. At block 2545, the image of the environment surrounding the LiDAR enclosure is constructed with the actual azimuth angle, the actual elevation angle, and the actual range of the plurality of detected points.

In some embodiments, before block 2505, the detected point is transformed to a positive octant from its original octant. Then, after block 2535, the detected point is transformed back to the original octant. These operations may make it easier to implement the method 2500.

The method 2500 is for instances when a LiDAR unit is mounted in the middle of the LiDAR enclosure, top to bottom. That is, for the LiDAR enclosure 100 shown in FIGS. 1A-1C, the LiDAR unit 115 emits laser light at h/2, or along the dashed line in FIG. 1B. When a LiDAR unit emits laser light at a different height, the method 2500 would be modified, but the basic operating principles are the same.

Additional Implementations

In some embodiments, to recover the laser beam paths lost to the dead zones, the side reflective surfaces of a LiDAR enclosure have a section removed and replaced with a window material. This modification would be useful if there is no other material in front or in back of the LiDAR enclosure blocking the otherwise "dead" laser beam paths.

In some embodiments, to recover the dead zones other reflective surfaces are introduced to reflect the laser light out of the LiDAR enclosure, such as a triangular wedge-shaped mirror to reflect the lasers sideways. In some embodiments, to recover the dead zones, the LiDAR enclosure is made out of two crossing rectangular parallelepipeds, so that instead of the long parallelepiped shown in FIG. 1, the horizontal cross section of the LiDAR enclosure is shaped like a plus sign (+). This embodiment could recover nearly all of the "dead" laser beam paths at the expense of relatively larger dimensions.

Co-parallel reflective surfaces set at an angle with respect to the centroid laser beam axis of the LiDAR unit could be included in a LiDAR enclosure to offset the LiDAR unit from where the laser beam exits the LiDAR enclosure (i.e., offset the LiDAR unit from where the laser beam exits the LiDAR enclosure, with the laser beam not having an elevation angle or an elevation angle of 0 degrees). A reflective surface could be off-set at an angle of up to 90 degrees minus the vertical half-angular spread of the LiDAR unit. If the reflective surface is off-set beyond that angle, additional dead-zone areas of the LiDAR enclosure would be introduced.

Figure 26:
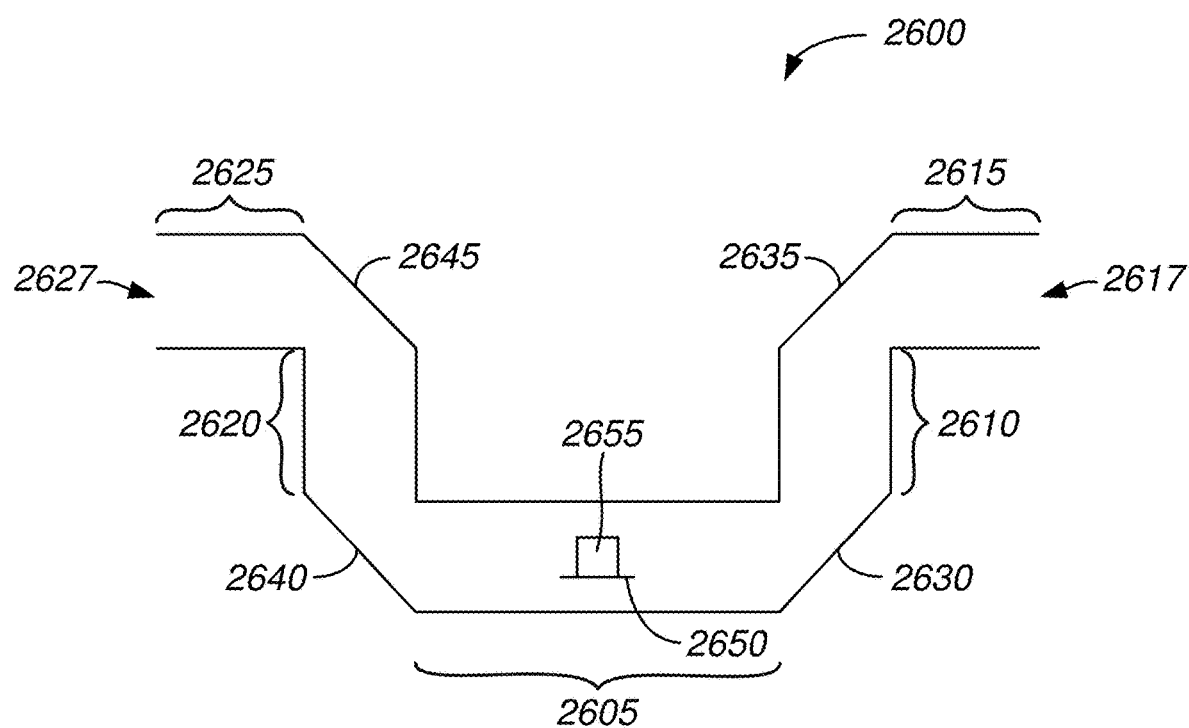
FIG. 26 shows an example of a schematic illustration of a LiDAR unit positioned in a LiDAR enclosure including reflective surfaces that enable a LiDAR unit in a LiDAR enclosure to be offset from where the laser beam exits the LiDAR enclosure.

FIG. 26 shows an example of a schematic illustration of a LiDAR unit positioned in a LiDAR enclosure including reflective surfaces that enable a LiDAR unit in a LiDAR enclosure to be offset from where the laser beam exits the LiDAR enclosure. These reflective surfaces are referred to as periscope features. In some embodiments, the periscope features are added to a LiDAR enclosure similar to the LiDAR enclosure 100 described in FIGS. 1A-IC. For example, the periscope features may be attachable and detachable from a LiDAR enclosure. In some embodiments, the periscope features are fabricated as a part of a LiDAR enclosure.

As shown in FIG. 26, a LiDAR enclosure 2600 includes a section 2605 that is similar to the LiDAR enclosure 100 shown in FIGS. 1A-1C. In some embodiments, no windows 122 and 124 of the LiDAR enclosure 100 as shown in FIGS. 1A-IC would be included with the section 2605. Sections 2610, 2615, 2620, and 2625 of the LiDAR enclosure 2600 have a square or rectangular cross-section and include four reflective surfaces. In some embodiments, the cross-sections of sections 2605, 2610, 2615, 2620, and 2625 are all identical. The reflective surfaces of sections 2610, 2615, 2620, and 2625 are the same as the reflective surfaces as described with respect to the LiDAR enclosure 100.

Section 2615 has an open end 2617 associated with the section. Section 2625 has an open end 2627 associated with the section. In some embodiments, windows, similar to the windows 122 and 124 described with respect to the LiDAR enclosure 100 cover open end 2617 and open end 2627.

The LiDAR enclosure 2600 includes an area 2650 for mounting a LiDAR unit 2655. In some embodiments, the area 2650 includes clamps, screws, bolts, or similar hardware so that a LiDAR unit 2655 can be mounted or installed inside the LiDAR enclosure 2600. In some embodiments, the LiDAR unit 2655 is rigidly mounted within the enclosure 2600.

The LiDAR enclosure 2600 further includes four surfaces 2630, 2635, 2640, and 2645 that are all positioned the same angles with respect to the reflective surfaces in sections 2605, 2610, 2615, 2620, and 2625. In some embodiments, the four surfaces 2630, 2635, 2640, and 2645 are all positioned at a 45 degree angle with respect to the reflective surfaces in sections 2605, 2610, 2615, 2620, and 2625. These reflective surfaces 2630, 2635, 2640, and 2645 serve to reflect laser beams from the LiDAR unit 2655 out of the plane in which the LiDAR unit 2655 is positioned. With the LiDAR enclosure 2600, a LiDAR unit can be operated such that it is not in a line of sight in the environment surrounding the LiDAR unit.

A LiDAR unit 2655 within a LiDAR enclosure 2600 can be operated as set forth in the method 2300 shown in FIG. 23. A method to construct an image of the environment surrounding the LiDAR enclosure 2600 with a plurality of detected points is similar to the methods 2400 and 2500 shown in FIGS. 24 and 25, respectively. When using a LiDAR enclosure 2600, however, the methods 2400 and 2500 would include further corrections for reflections of laser light off of the reflective surfaces 2630, 2635, 2640, and 2645. In some embodiments, the LiDAR enclosure 2600 may include only one open end 2617 or 2627 and a portion of the periscope features (i.e., only 2610, 2615, 2630, and 2635 or only 2620, 2625, 2640, and 2645). A LiDAR unit within such a LiDAR enclosure would only generate an image of the area around the open end of the LiDAR enclosure.

Figure 27A:
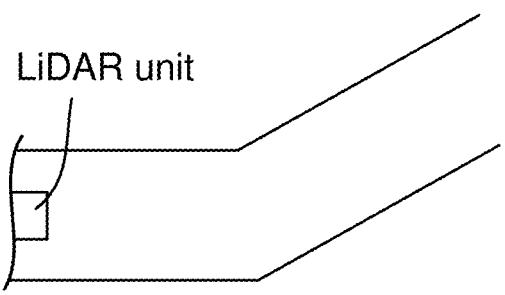
FIGS. 27A-27D show examples of schematic illustrations of a LiDAR unit positioned in a LiDAR enclosure including reflective surfaces that enable the LiDAR unit to be offset from where the laser beam exits the LiDAR enclosure.
Figure 27B:
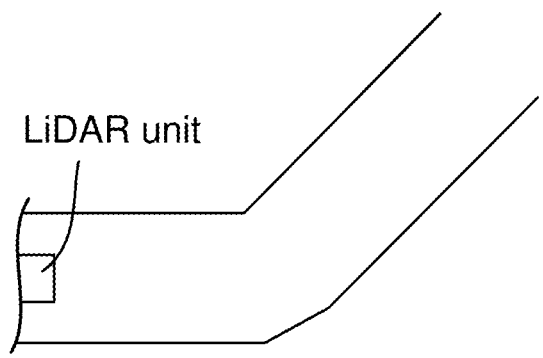
Figure 27C:
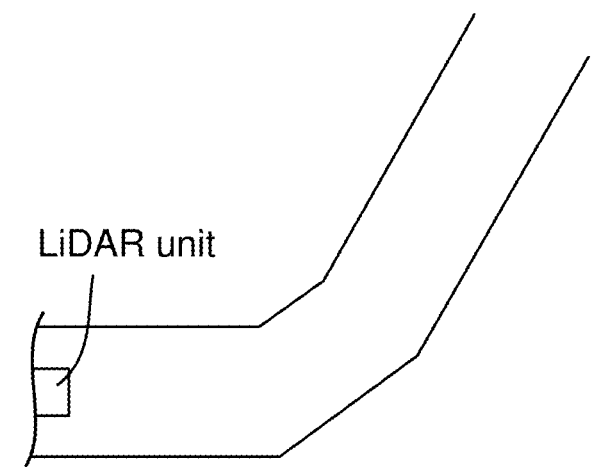
Figure 27D:
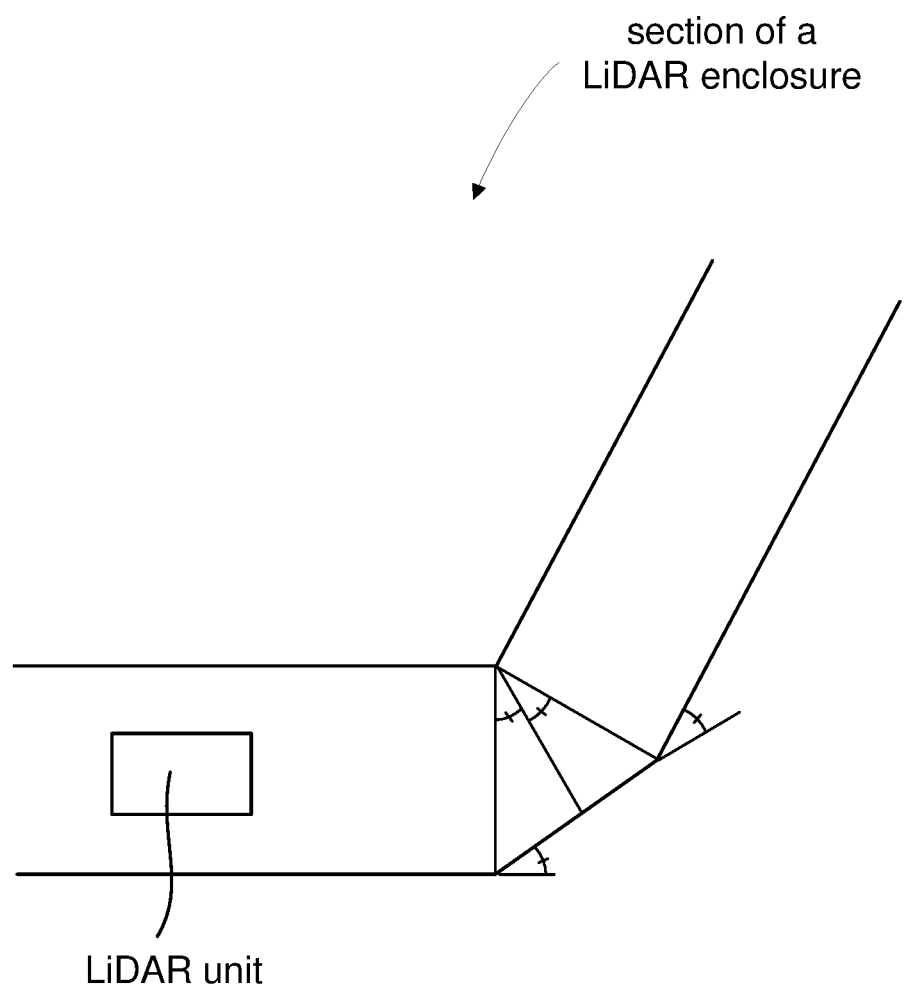

In some embodiments, different configurations of reflective surfaces can be used with a LiDAR enclosure to offset the LiDAR unit from where the laser beam exits the LiDAR enclosure, as shown in FIGS. 27A-27D. The LiDAR enclosure shown in FIG. 27D is similar to the LiDAR enclosure shown in FIG. 27B with the addition of indicators to show angles that are equal in measurement.

CONCLUSION

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method comprising:
   (a) providing an apparatus comprising:
      a light detection and ranging (LiDAR) unit, and
      a LiDAR enclosure comprising:
         a four-sided container having a square or rectangular cross-section, a first open end and a second open end comprising two opposite ends of the four-sided container,
         a mounting area inside the four-sided container and on a first side of the four-sided container, the mounting area operable to accept the LiDAR unit, the mounting area being about equidistant from the first open end and the second open end, the LiDAR unit being attached to the mounting area, and
         a reflective material disposed on an interior of a second side and a third side of the four-sided container, the second side and the third side being substantially perpendicular to the first side, and the second side and the third side being substantially parallel to one another;
   (b) generating laser light with the LiDAR unit;
   (c) detecting the laser light that has interacted with environment surrounding the LiDAR enclosure and that has been reflected back to the LiDAR unit; and
   (d) processing detected laser light to construct an image of the environment surrounding the LiDAR enclosure.

2. The method of claim 1, wherein the apparatus further comprises a material disposed over the first open end and the second open end of the four-sided container, and wherein the material transmits at least about 85% of generated laser light of the LiDAR unit.

3. The method of claim 2, wherein the material blocks at least about 85% of visible light.

4. The method of claim 1, wherein the reflective material comprises aluminum, copper, silver, or gold.

5. The method of claim 1, wherein operation (d) comprises:
   (e) receiving an azimuth angle and range from the LiDAR unit for a detected point in the detected laser light;
   (f) rejecting the detected point when the azimuth angle is greater than a maximum azimuth angle for generated laser light to escape the LiDAR enclosure;
   (g) when the detected point is not rejected, determining a number of reflections of the generated laser light and the detected laser light in the LiDAR enclosure;
   (h) when the number of reflections is greater than zero, correcting the azimuth angle of the detected point to an actual azimuth angle of the detected point and correcting the range of the detected point to an actual range of the detected point, and when the number of reflections is zero, the azimuth angle of the detected point is the actual azimuth angle of the detected point and the range of the detected point is the actual range of the detected point;
   (i) repeating operations (e)-(h) for a plurality of detected points; and
   (j) constructing the image of the environment surrounding the LiDAR enclosure with the actual azimuth angle and the actual range of the plurality of detected points.

6. The method of claim 5, further comprising:
prior operation (i), correcting an intensity of the detected point based on a number of reflections of the generated laser light and the detected laser light in the LiDAR enclosure.

7. The method of claim 5, further comprising:
before operation (e), transforming the detected point to a positive quadrant from its original quadrant; and
after operation (h), transforming the detected point back to the original quadrant.

8. A device comprising:
   a four-sided container having a square or rectangular cross-section, a first open end and a second open end comprising two opposite ends of the four-sided container;
   a mounting area inside the four-sided container and on a first side of the four-sided container, the mounting area operable to accept a light detection and ranging (LiDAR) unit, the mounting area being about equidistant from the first open end and the second open end; and
   a reflective material disposed on an interior of a second side and a third side of the four-sided container, the second side and the third side being substantially perpendicular to the first side, and the second side and the third side being substantially parallel to one another.

9. The device of claim 8, wherein the reflective material is disposed on the interior of the first side and a fourth side of the four-sided container, wherein the fourth side is substantially perpendicular to the second side and the third side, and wherein the first side and the fourth side are substantially parallel to one another.

10. The device of claim 8, further comprising:
a material disposed over the first open end and the second open end of the four-sided container, and wherein the material transmits at least about 85% of laser light generated by the LiDAR unit.

11. The device of claim 10, wherein the material blocks at least about 85% of visible light.

12. The device of claim 8, wherein the four-sided container comprises an acrylic.

13. The device of claim 8, wherein the reflective material comprises aluminum, copper, silver, or gold.

14. The device of claim 8, further comprising:
the LiDAR unit.

15. A method comprising:
(a) providing an apparatus comprising:
   a light detection and ranging (LiDAR) unit, and
   a LiDAR enclosure comprising:
      a four-sided container having a square or rectangular cross-section, a first open end and a second open end comprising two opposite ends of the four-sided container,
      a mounting area inside the four-sided container and on a first side of the four-sided container, the mounting area operable to accept the LiDAR unit, the mounting area being about equidistant from the first open end and the second open end, the LiDAR unit being attached to the mounting area, and
      a reflective material disposed on an interior of the first side, a second side, a third side, and a fourth side of the four-sided container, the second side and the third side being substantially perpendicular to the first side, the second side and the third side being substantially parallel to one another, the fourth side being substantially perpendicular to the second side and the third side, and the first side and the fourth side being substantially parallel to one another,
(b) generating laser light with the LiDAR unit;
(c) detecting the laser light that has interacted with environment surrounding the LiDAR enclosure and that has been reflected back to the LiDAR unit; and
(d) processing detected laser light to construct an image of the environment surrounding the LiDAR enclosure.

16. The method of claim 15, wherein the apparatus further comprises a material disposed over the first open end and the second open end of the four-sided container, and wherein the material transmits at least about 85% of generated laser light of the LiDAR unit.

17. The method of claim 16, wherein the material blocks at least about 85% of visible light.

18. The method of claim 15, wherein operation (d) comprises:
(e) receiving an azimuth angle, an elevation angle, and a range from the LiDAR unit for a detected point in the detected laser light;
(f) rejecting the detected point when the azimuth angle is greater than a maximum azimuth angle for generated laser light to escape the LiDAR enclosure or when the elevation angle is greater than a maximum elevation angle for the generated laser light to escape the LiDAR enclosure;
(g) when the detected point is not rejected, determining a number of azimuthal reflections of the generated laser light and the detected laser light in the LiDAR enclosure;
(h) when the number of azimuthal reflections is greater than zero, correcting the azimuth angle of the detected point to an actual azimuth angle of the detected point and correcting the range of the detected point to a corrected range of the detected point, and when the number of azimuthal reflections is zero, the azimuth angle of the detected point is the actual azimuth angle of the detected point and the range of the detected point is the corrected range of the detected point;
(i) when the detected point is not rejected, determining a number of elevation reflections of the generated laser light and the detected laser light in the LiDAR enclosure;
(j) when the number of elevation reflections is greater than zero, correcting the elevation angle of the detected point to an actual elevation angle of the detected point and correcting the corrected range of the detected point to an actual range of the detected point, and when the number of elevation reflections is zero, the elevation angle of the detected point is the actual elevation angle of the detected point and the corrected range of the detected point is the actual range of the detected point;
(k) repeating operations (e)-(j) for a plurality of detected points; and
(l) constructing the image of the environment surrounding the LiDAR enclosure with the actual azimuth angle, the actual elevation angle, and the actual range of the plurality of detected points.

19. The method of claim 18, further comprising:
prior to operation (k), correcting an intensity of the detected point based on a number of reflections of the generated laser light and the detected laser light in the LiDAR enclosure, wherein the number of reflections of the generated laser light and the detected laser light in the LiDAR enclosure includes the number of azimuthal reflections and the number of elevation reflections.

20. The method of claim 18, further comprising:
before operation (e), transforming the detected point to a positive octant from its original octant; and
after operation (j), transforming the detected point back to the original octant.

* * * * *